United States Patent
Yamashita

(10) Patent No.: US 8,504,247 B2
(45) Date of Patent: Aug. 6, 2013

(54) STEERING DEVICE FOR VEHICLE AND CONTROL METHOD FOR STEERING DEVICE

(75) Inventor: Masaharu Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 484 days.

(21) Appl. No.: 12/992,474

(22) PCT Filed: May 7, 2009

(86) PCT No.: PCT/IB2009/005511
§ 371 (c)(1), (2), (4) Date: Nov. 12, 2010

(87) PCT Pub. No.: WO2009/138837
PCT Pub. Date: Nov. 19, 2009

(65) Prior Publication Data
US 2011/0066331 A1    Mar. 17, 2011

(30) Foreign Application Priority Data
May 12, 2008  (JP) .................................. 2008-124828

(51) Int. Cl.
*B62D 5/04*    (2006.01)

(52) U.S. Cl.
USPC .............. 701/43; 701/41; 340/438; 340/455; 180/410; 180/412; 180/443; 180/446

(58) Field of Classification Search
USPC ......... 701/41, 42, 43; 340/438, 455; 180/410, 180/412, 443, 446
See application file for complete search history.

(56) References Cited

U.S. PATENT DOCUMENTS

| 4,624,335 A | 11/1986 | Shiraishi et al. |
| 5,271,475 A | 12/1993 | Takeshita |
| 7,234,564 B2 * | 6/2007 | Farrelly et al. ................ 180/412 |

(Continued)

FOREIGN PATENT DOCUMENTS

| CN | 101146706 A | 3/2008 |
| EP | 0 137 491 | 4/1985 |

(Continued)

OTHER PUBLICATIONS

Office Action issued Apr. 27, 2010, in Japan Patent Application No. 2008-124828 (with English-language Translation).

(Continued)

*Primary Examiner* — Thomas Black
*Assistant Examiner* — Peter D Nolan
(74) *Attorney, Agent, or Firm* — Oblon, Spivak, McClelland, Maier & Neustadt, L.L.P.

(57) ABSTRACT

An assist control portion, upon detecting source power supply abnormality of a main electric power source, switches the characteristic of an assist map in which the steering torque and the target current are related to each other from an original assist characteristic to an abnormality-time assist characteristic. Therefore, the steering handle operation suddenly becomes heavy, thereby causing the driver to be aware of the abnormality. After that, the abnormality-time assist characteristic is altered so that the assist force relative to the steering torque further decline in accordance with declines in the actual amount of charge of the subsidiary electric power source declines. Therefore, the steering handle operation gradually becomes heavier, thereby causing the driver to anticipate that the abnormality is further progressing.

13 Claims, 12 Drawing Sheets

U.S. PATENT DOCUMENTS

| | | |
|---|---|---|
| 7,389,851 B2 * | 6/2008 | Miyaura .................. 180/446 |
| 7,402,970 B2 * | 7/2008 | Kawada et al. ............ 318/432 |
| 2008/0035411 A1 | 2/2008 | Yamashita et al. |
| 2008/0177444 A1 | 7/2008 | Tachibana et al. |

FOREIGN PATENT DOCUMENTS

| | | |
|---|---|---|
| EP | 1 958 851 | 8/2008 |
| JP | 6-191418 | 7/1994 |
| JP | 6-344937 | 12/1994 |
| JP | 2003-153461 | 5/2003 |
| JP | 2005 014721 | 1/2005 |
| JP | 2005 199908 | 7/2005 |
| JP | 2005 312510 | 11/2005 |
| JP | 2005 343323 | 12/2005 |
| JP | 2007 091122 | 4/2007 |
| JP | 2007-125915 | 5/2007 |
| JP | 2009-208701 | 9/2009 |
| WO | 2007 066487 | 6/2007 |

OTHER PUBLICATIONS

International Search Report issued Aug. 17, 2009 in PCT/IB09/005511 filed May 7, 2009.

* cited by examiner

STEERING DEVICE FOR VEHICLE AND CONTROL METHOD FOR STEERING DEVICE

BACKGROUND OF THE INVENTION

1. Field of the Invention

The invention relates to a steering device that is equipped with an electric motor so as to provide steering assist force for the pivoting operation of a steering handle and a control method for the steering device.

2. Description of the Related Art

An electric power steering device according to the related art is equipped with an electric motor so as to provide steering assist force for the pivoting operation of a steering handle, and adjusts the steering assist force by controlling the electrification of the electric motor. Such an electric power steering device is supplied with source power from a vehicle-mounted electric power source device. However, in the case where an abnormality occurs in the vehicle-mounted electric power source device, the electric power steering device cannot appropriately perform the control of the electric motor. Therefore, for example, an electric power steering device proposed in Japanese Patent Application Publication No. 2005-343323 (JP-A-2005-343323) adopts a construction in which when the power source voltage of the vehicle-mounted electric power supply device declines and reaches a first reference value, the maximum drive current of the electric motor is restricted, and when the power source voltage reaches a second reference value, the motor control output gain is reduced, and when the power source voltage reaches a third reference value, the output restraint control is performed.

Besides, an electric power steering device in which the electric power supply device that supplies source power to an electric motor is constructed of two electric power sources is also known, for example, in Japanese Patent Application Publication No. 2007-91122 (JP-A-2007-91122). In the construction equipped with two electric power sources, if one of the electric power sources fails, the electric motor can still be driven by using the other electric power source so as to obtain the steering assist force.

However, in the case where one of the two electric power sources fails, if the electric motor is driven and controlled by using the other electric power source without any particular change or the like, it becomes difficult to make the driver aware of the system abnormality of the electric power steering device. For example, even if the system abnormality is indicated by turning on a warning lamp, or the like, the driver sometimes does not notice it. In such a case, if the electric motor is driven and controlled by using the other electric power source (the electric power source that is normal) without any particular change, the source power supply capability of that electric power source rapidly declines, and the system stops in an early period. Besides, the steering assist is suddenly lost, thus causing considerable discomfort to the driver.

SUMMARY OF THE INVENTION

The invention provides a steering device for a vehicle that makes a driver of the vehicle aware of an abnormality of one of electric power sources in an early period if such an abnormality occurs, and that favorably maintains the source power supply from another electric power source so as to increase the length of period during which the steering assist can be performed, and a control method for the steering device.

A first aspect of the invention relates to a vehicle steering device that includes: a steering mechanism that steers a wheel of a vehicle upon steering operation of a steering handle; an electric motor that is supplied with source power from an electric power supply device in which a first electric power source and a second electric power source are interconnected in parallel, and that generates assist force that assists in the steering operation of the steering handle; steering torque detection means for detecting steering torque that is input to the steering handle by a driver of the vehicle; and motor control means for controlling driving of the electric motor based on an assist characteristic in which a relation between the steering torque and the assist force is set so as to have a characteristic that the assist force increases in accordance at least with increases in the steering torque. The vehicle steering device includes: first electric power source abnormality detection means for determining whether or not source power supply from the first electric power source is abnormal; second source power supply capability detection means for detecting source power supply capability of the second electric power source; assist characteristic switch means for switching, when it is determined that the source power supply from the first electric power source is abnormal, the assist characteristic from the assist characteristic set for a time when the source power supply from the first electric power source is normal to an abnormality-time assist characteristic in which the assist force relative to the steering torque is set lower than in the assist characteristic set for the time of normality; and assist characteristic alteration means for altering, after the assist characteristic is switched to the abnormality-time assist characteristic by the assist characteristic switch means, the abnormality-time assist characteristic so that the assist force relative to the steering torque further declines in accordance with declines in the source power supply capability of the second electric power source detected by the second source power supply capability detection means.

In the steering device in accordance with this aspect of the invention, the first electric power source may be a main electric power source that supplies source power to the electric motor and to a vehicle-mounted electrical load other than the electric motor, and the second electric power source may be an auxiliary electric power source that stores electric power the first electric power source outputs, and that supplies source power to the electric motor by using the electric power stored.

Besides, in the steering device in accordance with the foregoing aspect, the second source power supply capability detection means may detect the source power supply capability of the second electric power source from the amount of charge of the second electric power source.

According to the foregoing constructions, the steering torque detection means detects the steering torque input to the steering handle, and the motor control means controls the driving of the electric motor on the basis of the assist characteristic. In this assist characteristic, a relation between the steering torque and the assist force is set so as to have a so as to have a characteristic that the assist force increases in accordance at least with increases in the steering torque. This assist characteristic can be stored, for example, as a reference map or a function. Therefore, the driver is favorably assisted in the steering operation by the control of the driving of the electric motor by the motor control means. The electric motor is supplied with source power from the electric power supply device in which the first electric power source and the second electric power source are interconnected in parallel.

The assist characteristic switch means, when the source power supply abnormality of the first electric power source is detected, switches the assist characteristic to the abnormality-time assist characteristic in which the assist force relative to the steering torque is set lower than when the source power supply of the first electric power source is normal. Therefore, at this time point, the assist force relative to the steering torque can be suddenly lowered. As a result, the driver feels that the steering handle operation has suddenly become heavy, and therefore can be aware of the abnormality of the steering device.

If the source power supply abnormality of the first electric power source occurs, then the source power supply capability of the second electric power source gradually declines. Therefore, the assist characteristic alteration means alters the abnormality-time assist characteristic so that the assist force relative to the steering torque further declines in accordance with declines in the source power supply capability of the second electric power source detected by the second source power supply capability detection means. Therefore, the assist force obtained relative to the steering operation performed by the driver further declines. As a result, the driver feels that the steering handle operation is gradually becoming heavier, and therefore can anticipate that the abnormality of the steering device is progressing. In this case, although the steering handle operation becomes heavy, the steering assist can be maintained for a longer time since the electric power consumption of the second electric power source is restrained.

Thus, according to the foregoing construction, since the assist force can be suddenly lowered when abnormality occurs in the first electric power source, the driver can be caused to be aware of the abnormality of the steering device. After that, since the assist characteristic is altered in accordance with declines in the source power supply capability of the second electric power source, the source power supply of the second electric power source can be favorably maintained, and the period during which the steering assist is possible can be elongated. Furthermore, since the steering handle operation gradually becomes heavier in accordance with declines in the source power supply capability of the second electric power source, the driver can be caused to anticipate that the abnormality of the steering device is progressing (is worsening). Therefore, for example, even when the steering assist completely stops, the driver will not be surprised.

In the steering device in accordance with the foregoing aspect, the abnormality-time assist characteristic that is switched by the assist characteristic switch means may be the assist characteristic that is commensurate with the source power supply capability of the second electric power source detected by the second source power supply capability detection means.

According to this construction, the maintenance of the source power supply of the second electric power source can be further properly performed. In this case, since the abnormality-time assist characteristic is a characteristic in which the assist force relative to the steering torque is lower than during the time of normality of the source power supply of the first electric power source even if the source power supply capability of the second electric power source is high, the driver can be caused to be aware of the source power supply abnormality of the first electric power source when the abnormality is detected.

In the steering device in accordance with the foregoing aspect, the assist characteristic may be a characteristic in which the relation between the steering torque and the assist force is set based on the steering torque and a target current value of the electric motor, and the assist characteristic switch means may switch the assist characteristic to the abnormality-time assist characteristic by shifting a value of the steering torque relative to the target current value to an increase side.

The assist force generated by the electric motor can be controlled by the value of the current of the electric motor. Therefore, in this invention, the relation between the steering torque and the target current value of the electric motor in the assist characteristic is set so that the target current value increases with increases in the steering torque. If the source power supply abnormality of the first electric power source is detected, the assist characteristic switch means switches the assist characteristic to the abnormality-time assist characteristic by shifting the values of the steering torque relative to the target current values to the increase side. Therefore, the target current value set corresponding to the steering torque that the driver inputs to the steering handle becomes smaller than when the source power supply is normal. In other words, the steering torque that the driver needs to input in order to obtain an assist force enlarges. As a result, the driver feels that the steering handle operation suddenly becomes heavy, and therefore can be aware of the abnormality of the steering device.

In the steering device in accordance with the foregoing aspect, the assist characteristic alteration means may alter the abnormality-time assist characteristic by further shifting a value of the steering torque relative to the target current value to an increase side.

According to this construction, after the assist characteristic is switched to the abnormality-time assist characteristic by the assist characteristic switch means, the assist characteristic alteration means further shifts the values of the steering torque relative to the target current values to the increase side by altering the relation between the steering torque and the target current value in the assist characteristic in accordance with declines in the source power supply capability of the second electric power source. As a result, the assist force relative to the steering torque further declines. Therefore, since the steering handle operation gradually becomes heavier in accordance with declines in the source power supply capability of the second electric power source, the driver can be caused to anticipate that the abnormality of the steering device is progressing. Therefore, even when the steering assist completely stops, the driver will not be surprised. Besides, the electric power consumption of the second electric power source can be reduced, and the period during which the steering assist is possible can be elongated.

The steering device in accordance with the foregoing aspect may further include a vibration actuator that vibrates the steering handle, and vibration control means for intermittently operating the vibration actuator if source power supply abnormality of the first electric power source is detected by the first electric power source abnormality detection means.

According to this construction, the vibration actuator that vibrates the steering handle is provided, and the vibration control means intermittently operates the vibration actuator if the source power supply abnormality of the first electric power source is detected. As a result, the driver can be reliably caused to be aware of the abnormality by not only decline in the assist force but also vibration of the steering handle.

The steering device in accordance with the foregoing aspect may further include vibration operation duration proportion control means for increasing an operation duration proportion in intermittent operation of the vibration actuator in accordance with declines in the source power supply capability of the second electric power source detected by the second source power supply capability detection means, and for causing the vibration actuator to be in a continuously operating state when the source power supply capability of the second electric power source becomes below a reference level.

According to this construction, the vibration operation duration proportion control means increases the proportion of operation duration proportion in the intermittent operation of the vibration actuator, that is, the proportion of the time during which the vibration actuator is caused to be performing the vibrating operation to the total of the time during which the vibrating operation is performed and the time during which the vibrating operation is stopped, in accordance with declines in the source power supply capability of the second electric power source. Then, when the source power supply capability of the second electric power source becomes below the reference level, the vibration actuator is cause to be in the continuously operating state. Therefore, according to the invention, since the proportion of the duration of the vibration of the steering handle increases with declines in the assist force, the driver can easily be caused to anticipate that the abnormality is progressing. Furthermore, since the vibration switches from the intermittent manner to the continuous manner, the driver can be caused to expect that the time of stop of the steering assist is near.

The steering device in accordance with the foregoing aspect may further include operation stop means for stopping the operation of the vibration actuator and generation of the assist force by the electric motor at elapse of at least a predetermined time after the source power supply capability of the second electric power source becomes below the reference level.

According to this construction, at least a predetermined time after the vibration actuator is caused to be in the continuously operating state, the operation stop means stops the operation of the vibration actuator and the generation of the assist force by the electric motor. As a result, the decline in the source power supply capability of the second electric power source can be stopped. Therefore, the second electric power source can be allowed to retain electric power.

In the steering device in accordance with the foregoing aspect, the vibration actuator may be an electric motor, and the vibration control means may change amount of electrification of the electric motor in a vibrating manner during a period during which the steering handle is vibrated.

According to this construction, the steering handle is vibrated by changing, in a vibrating manner, the amount of electrification of the electric motor that generates the assist force. Therefore, there is no need to nearly provide an actuator dedicated to the vibration, and therefore a cost increase is not brought about. Besides, an installation space for the actuator is also unnecessary.

The steering device in accordance with the foregoing aspect may further include voltage detection means for detecting output voltage of the first electric power source, and current detection means for detecting output current of the second electric power source. In this steering device, the source power supply from the first electric power source being normal may be a state in which the detected output voltage of the first electric power source is greater than or equal to a predetermined value, and the first electric power source abnormality detection means may determine that the source power supply from the first electric power source is abnormal, when the detected output voltage of the first electric power source is below the predetermined value. Furthermore, the second source power supply capability detection means may calculate the amount of charge of the second electric power source based on the detected output current of the second electric power source.

A second aspect of the invention relates to a control method for a vehicle steering device that includes: a steering mechanism that steers a wheel of a vehicle upon steering operation of a steering handle; an electric motor that is supplied with source power from an electric power supply device in which a first electric power source and a second electric power source are interconnected in parallel, and that generates assist force that assists in the steering operation of the steering handle; steering torque detection means for detecting steering torque that is input to the steering handle by a driver of the vehicle; and motor control means for controlling driving of the electric motor based on an assist characteristic in which a relation between the steering torque and the assist force is set so as to have a characteristic that the assist force changes according at least to the steering torque. The control method includes: determining whether or not source power supply from the first electric power source is abnormal; detecting source power supply capability of the second electric power source; switching, when it is determined that the source power supply from the first electric power source is abnormal, the assist characteristic from the assist characteristic set for a time when the source power supply of the first electric power source is normal to an abnormality-time assist characteristic in which the assist force relative to the steering torque is set lower than in the assist characteristic set for the time of normality; and altering, after the assist characteristic is switched to the abnormality-time assist characteristic by the assist characteristic switch means, the abnormality-time assist characteristic so that the assist force relative to the steering torque further declines in accordance with declines in the source power supply capability of the second electric power source detected by the second source power supply capability detection means.

The control method in accordance with this aspect may further include: detecting output voltage of the first electric power source; and detecting output current of the second electric power source, and the source power supply from the first electric power source being normal may be a state in which the detected output voltage of the first electric power source is greater than or equal to a predetermined value, and it may be determined that the first electric power source is in an abnormal source power supply state, when the detected output voltage of the first electric power source is below the predetermined value, and the source power supply capability of the second electric power source may be detected based on the detected output current of the second electric power source.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
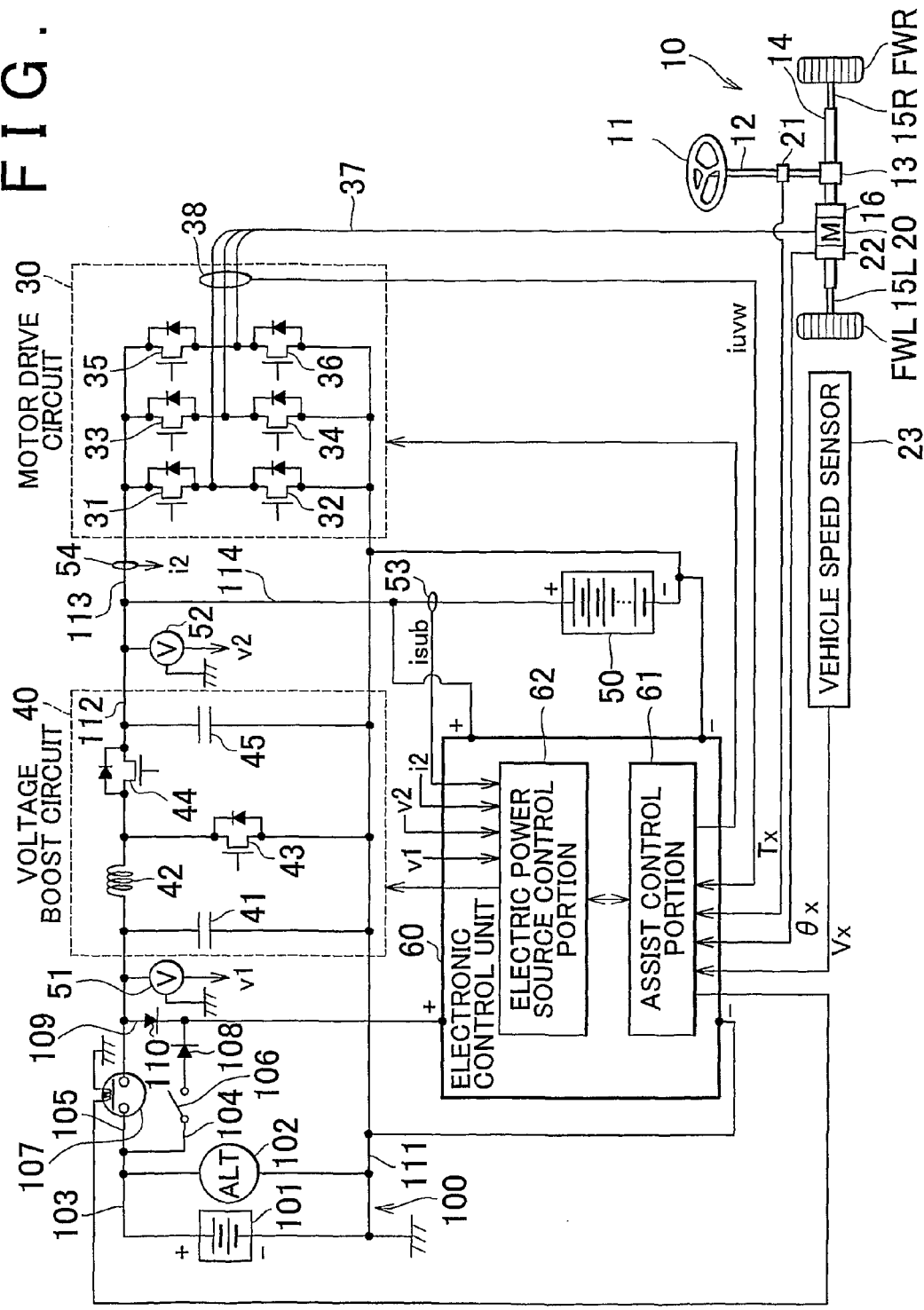
FIG. 1 is a general system construction diagram of an electric power steering device in accordance with a first embodiment of the invention.

A steering device for a vehicle in accordance with a first embodiment of the invention will be described hereinafter with reference to the drawings. FIG. 1 represents a general construction of an electric power steering device for a vehicle as the first embodiment.

This electric power steering device includes, as main portions, a steering mechanism 10 that steers steering road wheels according to the steering operation of a steering handle 11, an electric motor 20 assembled to the steering mechanism 10 to generate steering assist torque, a motor drive circuit 30 that drives the electric motor 20, a voltage boost circuit 40 that boosts the output voltage of a main electric power source 100 and thus supplies source power to the motor drive circuit 30, a subsidiary electric power source 50 connected in parallel with a power source supply circuit between the voltage boost circuit 40 and the motor drive circuit 30, and an electronic control unit 60 that controls the operation of the electric motor 20 and the voltage boost circuit 40. The electronic control unit 60 is an example of a control device in the invention. Incidentally, although a plurality of embodiments are described in this specification, those are different merely in the control process of the electronic control unit 60, and are the same in the hardware construction.

The steering mechanism 10 is a mechanism for steering left and right front wheels FWL, FWR by rotationally operating the steering handle 11, and includes a steering shaft 12 that is connected at an upper end thereof to the steering handle 11 so as to rotate integrally with the steering handle 11. A pinion 13 is connected to a lower end of the steering shaft 12 so as to rotate integrally with the steering shaft. The pinion 13 meshes with rack teeth formed on a rack bar 14, thus forming a rack-and-pinion mechanism together with the rack bar 14. Knuckles (not shown) of the left and right front wheels FWL, FWR are steerably connected to two ends of the rack bar 14 via tie rods 15L, 15R. The left and right front wheels FWL, FWR are steered to left and right according to the displacement of the rack bar 14 in the direction of its own axis associated with the rotation of the steering shaft 12 about its own axis.

The electric motor 20 for the steering assist is assembled to the rack bar 14. A rotation shaft of the electric motor 20 is connected to the rack bar 14 via a ball screw mechanism 16 so as to be capable of transmitting mechanical power. Rotation of the rotation shaft gives steering force to the left and right front wheels FWL, FWR, thus assisting a driver in the steering operation. The ball screw mechanism 16 functions as a speed reducer and a rotary-linear motion converter, that is, transmits the motion of the electric motor 20 to the rack bar 14 while reducing the speed of the rotation of the electric motor 20 and converting the rotation into linear motion.

The steering shaft 12 is provided with a steering torque sensor 21. The steering torque sensor 21 outputs a signal commensurate with the steering torque that acts on the steering shaft 12 due to the pivoting operation of the steering handle 11. The value of steering torque detected by the signal output by the steering torque sensor 21 will be hereinafter termed the steering torque Tx. By the positive and negative signs of the steering torque Tx, the operating direction of the steering handle 11 is discerned. In this embodiment, the steering torque Tx caused when the steering handle 11 is steered in the right-hand direction is shown as a positive value, and the steering torque Tx caused when the steering handle 11 is steered in the left-hand direction is shown as a negative value. Therefore, when the magnitude of the steering torque Tx is discussed below, the magnitude of the absolute value thereof will be used. The steering torque sensor 21 is an example of a steering torque detection means in the invention.

The electric motor 20 is provided with a rotation angle sensor 22. This rotation angle sensor 22 is incorporated in the electric motor 20, and outputs a detection signal commensurate with the rotational angular position of a rotor of the electric motor 20. The detection signal from the rotation angle sensor 22 is used to calculate the rotation angle and the rotation angular velocity of the electric motor 20. In addition, the rotation angle of the electric motor 20 is proportional to the steering angle of the steering handle 11, and is therefore used as the steering angle of the steering handle 11 as well. Besides, the rotation angular velocity, which is a time derivative of the rotation angle of the electric motor 20, is proportional to the steering angular velocity of the steering handle 11, and is therefore used as the steering speed of the steering handle 11 as well. Hereinafter, the value of the steering angle of the steering handle 11 detected from the output signal of the rotation angle sensor 22 will be termed the steering angle $\theta x$, and the value of the steering angular velocity obtained by differentiating the steering angle $\theta x$ with respect to time will be termed the steering speed $\omega x$. The positive sign and the negative sign of the value of the steering angle $\theta x$ represent the steering angles in the rightward direction and the leftward direction, respectively, from the neutral position of the steering handle 11. In this embodiment, the neutral position of the steering handle 11 is shown by "0", and the steering angle in the rightward direction from the neutral position is shown by a positive value, and the steering angle in the leftward direction from the neutral position is shown by a negative value.

The motor drive circuit 30 is a three-phase inverter circuit constructed of six switching elements 31 to 36 which are each made up of a MOSFET. Concretely, a circuit formed by connecting a first switching element 31 and a second switching element 32 in series, a circuit formed by connecting a third switching element 33 and a fourth switching element 34 in series, a circuit formed by connecting a fifth switching element 35 and a sixth switching element 36 in series are interconnected in parallel, and a power source supply line 37 is led out from a line between two switching elements (31-32, 33-34, 35-36) of each of the series circuits.

A current sensor 38 is provided on the power source supply lines 37 extending from the motor drive circuit 30 to the electric motor 20. This current sensor 38 detects (measures) the electric current that flows separately for each phase, and outputs a detection signal corresponding to the detected electric current value to the electronic control unit 60. Hereinafter, the measured electric current value will be termed the motor current iuvw. Besides, this current sensor 38 will be termed the motor current sensor 38.

As for each of the switching elements 31 to 36, the gate thereof is connected to an assist control portion 61 (described later) of the electronic control unit 60, and the duty ratio is controlled by a PWM control signal from the assist control portion 61. As a result, the drive voltage of the electric motor 20 is adjusted to a target voltage. Incidentally, as shown by a circuit symbol in the diagram, each of the MOSFETs constituting the switching elements 31 to 36 has a parasitic diode as a part of its structure.

Next, a power source supply system of the electric power steering device will be described. An electric power source device of the electric power steering device includes the main electric power source 100, the voltage boost circuit 40 that boosts the output voltage of the main electric power source 100, the subsidiary electric power source 50 connected in parallel with and between the voltage boost circuit 40 and the motor drive circuit 30, and an electric power source control portion 62 that is provided in the electronic control unit 60 and that controls the voltage boosted by the voltage boost circuit 40.

The main electric power source 100 is constructed by interconnecting in parallel a main battery 101 that is a common vehicle-mounted battery having a rated output voltage of 12 V, and an alternator 102 having a rated output voltage of 14 V which generates electricity by rotation of the engine. Therefore, the main electric power source 100 constitutes a vehicle-mounted electric power source of a 14-V system.

The main electric power source 100 supplies source power to not only the electric power steering device but also other vehicle-mounted electrical loads, such as headlights and the like. A power source supplier line 103 is connected to a power source terminal (positive terminal) of the main battery 101, and a grounding line 111 is connected to a ground terminal thereof. The main electric power source 100 is an example of a first electric power source of the invention.

The power source supplier line 103 branches into a control system power source line 104 and a drive system power source line 105. The control system power source line 104 functions as a power source line for supplying source power only to the electronic control unit 60. The drive system power source line 105 functions as a power source line for supplying source power to both the motor drive circuit 30 and the electronic control unit 60.

An ignition switch 106 is connected to the control system power source line 104. A power source relay 107 is connected to the drive system power source line 105. This power source relay 107 turns on by a control signal from the assist control portion 61 of the electronic control unit 60, so as to form an electric power supply circuit for the electric motor 20. The control system power source line 104 is connected to the source positive terminal of the electronic control unit 60, and has a diode 108 in an intermediate portion thereof that is to the load side (the electronic control unit 60 side) of the ignition switch 106. The diode 108 is a back-flow prevention element whose cathode is provided on the electronic control unit 60 side and whose anode is provided on the main electric power source 100 side, and which allows current to pass only in the direction of power source supply.

From the drive system power source line 105, a linkage line 109 branches which connects to the control system power source line 104 at the load side of the power source relay 107. The linkage line 109 is connected to the electronic control unit 60 side of the connecting location at which the diode 108 is connected to the control system power source line 104. Besides, a diode 110 is connected to the linkage line 109. This diode 110 is provided with its cathode connected to the control system power source line 104 side, and its anode connected to the drive system power source line 105 side. Therefore, a circuit construction is formed in which source power can be supplied from the drive system power source line 105 to the control system power source line 104 via the linkage line 109, but cannot be supplied from the control system power source line 104 to the drive system power source line 105. The drive system power source line 105 and the grounding line 111 are connected to the voltage boost circuit 40. Besides, the grounding line 111 is also connected to a grounding terminal of the electronic control unit 60.

A voltage sensor 51 is provided on the drive system power source line 105 between the voltage boost circuit 40 and the power source relay 107. The voltage sensor 51 is provided for detecting a state of being unable to supply source power from the main electric power source 100 to the electric motor 20. The voltage sensor 51 detects (measures) the voltage between the drive system power source line 105 and the grounding line 111, and outputs a signal of detection to the electric power source control portion 62, and, via the electric power source control portion 62, to the assist control portion 61. Hereinafter, this voltage sensor 51 will be termed the first voltage sensor 51, and the voltage value detected thereby will be termed the main power source voltage v1.

The voltage boost circuit 40 is constructed of a capacitor 41 provided between the drive system power source line 105 and the grounding line 111, a voltage-boosting coil 42 connected in series to the drive system power source line 105 on the load side of the connecting point of the capacitor 41, a first voltage-boosting switching element 43 connected between the drive system power source line 105 on the load side of the voltage-boosting coil 42 and the grounding line 111, a second voltage-boosting switching element 44 connected in series to the drive system power source line 105 on the load side of the connecting point of the first voltage-boosting switching elements 43, and a capacitor 45 connected between the drive system power source line 105 on the load side of the second voltage-boosting switching element 44 and the grounding line 111. A boosted-voltage power source line 112 is connected to the secondary side of the voltage boost circuit 40.

In this embodiment, the voltage-boosting switching elements 43, 44 are MOSFETs; however, other types of switching elements may also be used as the voltage-boosting switching elements 43, 44. Besides, as shown by circuit symbols in the diagram, each of the MOSFETs constituting the voltage-boosting switching elements 43, 44 has a parasitic diode as a part of its structure.

As for the voltage boost circuit 40, the voltage boost is controlled by the electric power source control portion 62 of the electronic control unit 60. The electric power source control portion 62 outputs pulse signals of a predetermined frequency to the gates of the first and second voltage-boosting switching elements 43, 44 to turn on and off the two switching elements 43, 44 so that the source power supplied from the main electric power source 100 is boosted in voltage and a predetermined output voltage is generated on the boosted-voltage power source line 112. In this case, the first and second voltage-boosting switching elements 43, 44 are controlled so that their on-off actions are opposite to each other. The voltage boost circuit 40, in operation, has the first voltage-boosting switching element 43 on and the second voltage-boosting switching element 44 off to let current flow through the voltage-boosting coil 42 only for a short time so that electric power is accumulated in the voltage-boosting coil 42, and then immediately have the first voltage-boosting switching element 43 off and the second voltage-boosting switching element 44 on so that the electric power accumulated in the voltage-boosting coil 42 is output.

The output voltage of the second voltage-boosting switching element 44 is smoothed by the capacitor 45. Therefore, a stable boosted-voltage source power is output from the boosted-voltage power source line 112. In this case, a plurality of capacitors of different frequencies may be connected in parallel to improve the smoothing characteristic. Besides, the capacitor 41 provided on the input side of the voltage boost circuit 40 removes the noise that would otherwise go to the main electric power source 100 side.

The boosted voltage (output voltage) of the voltage boost circuit 40 can be adjusted, for example, in the range of 20 V to 50 V, by the control of the duty ratio (PWM control) of the first and second voltage-boosting switching elements 43, 44. Incidentally, as the voltage boost circuit 40, it is permissible to use a general-purpose DC-DC converter.

The boosted-voltage power source line 112 branches into a boosted voltage drive line 113 and a charge/discharge line 114. The boosted voltage drive line 113 is connected to a power source input portion of the motor drive circuit 30. The charge/discharge line 114 is connected to a positive terminal of the subsidiary electric power source 50.

The subsidiary electric power source 50 is an electric storage device that stores electric power input from the voltage boost circuit 40, and that assists the main electric power source 100 by supplying source power to the motor drive circuit 30 when the motor drive circuit 30 needs a large amount of electric power. Besides, when the main electric power source 100 fails (loses its capacity of supplying source power), the subsidiary electric power source 50 is used so as to singly supply source power to the motor drive circuit 30. Therefore, the subsidiary electric power source 50 is constructed by connecting a plurality of electric storage cells in series so that a voltage corresponding to the boosted voltage of the voltage boost circuit 40 can be maintained. A grounding terminal of the subsidiary electric power source 50 is connected to the grounding line 111. As this subsidiary electric power source, it is permissible to use, for example, a capacitor (electric double layer capacitor). The subsidiary electric power source 50 is an example of a second electric power source of the invention.

The subsidiary electric power source 50 supplies source power also to the electronic control unit 60. When the source power supply from the main electric power source 100 to the electronic control unit 60 cannot be performed well, the subsidiary electric power source 50 supplies source power to the electronic control unit 60, in place of the main electric power source 100. Incidentally, the electronic control unit 60 has a voltage-lowering circuit (DC/DC converter, not shown) that lowers the voltage of the source power supplied from the subsidiary electric power source 50 and that is built in a power-receiving portion. Using this voltage-lowering circuit, the electronic control unit 60 adjusts the voltage to a proper voltage.

A voltage sensor 52 is provided on the output side of the voltage boost circuit 40. The voltage sensor 52 detects the voltage between the boosted-voltage power source line 112 and the grounding line 111, and outputs a signal commensurate with the detected value to the electric power source control portion 62. In this circuit construction, since the boosted-voltage power source line 112 and the charge/discharge line 114 are connected, the measurement value measured by the voltage sensor 52 is the higher voltage value of the output voltage (boosted voltage) of the voltage boost circuit 40 and the output voltage (power source voltage) of the subsidiary electric power source 50. Hereinafter, the voltage sensor 52 will be termed the second voltage sensor 52, and the voltage value detected thereby will be termed the output power source voltage v2.

The boosted voltage drive line 113 is provided with a current sensor 54 that detects the current that flows through the motor drive circuit 30. The current sensor 54 is connected to the electric power source control portion 62 of the electronic control unit 60, and outputs a signal that shows the measured value to the electric power source control portion 62. Hereinafter, this current sensor 54 will be termed the output current sensor 54, and the current value detected thereby will be termed the output current i2.

Besides, the charge/discharge line 114 is provided with a current sensor 53 that detects the current flowing through the subsidiary electric power source 50. The current sensor 53 is connected to the electric power source control portion 62 of the electronic control unit 60, and outputs a signal that shows the measured charge/discharge current isub, to the electric power source control portion 62. The current sensor 53 discriminates the directions of current, that is, the charge current that flows from the voltage boost circuit 40 to the subsidiary electric power source 50, and the discharge current that flows from the subsidiary electric power source 50 to the motor drive circuit 30, and measures the magnitude thereof. The charge/discharge current isub is represented by a positive value when flowing as a charge current, and is represented by a negative value when flowing as a discharge current. Hereinafter, the current sensor 53 will be termed the subsidiary power source current sensor 53, and the current value detected thereby will be termed the subsidiary power source current isub. The subsidiary power source current sensor 53 is an example of current detection means in the invention.

The electronic control unit 60 has, as a main portion, a microcomputer that has a built-in memory and the like. The functions of the electronic control unit 60 are roughly divided into the assist control portion 61 and the electric power source control portion 62. The assist control portion 61 is connected to the steering torque sensor 21, the rotation angle sensor 22, the motor current sensor 38, and a vehicle speed sensor 23, and receives inputs of sensor signals that show the steering torque Tx, the steering angle θx, the motor current iuvw, and the vehicle speed Vx. The assist control portion 61, on the basis of these sensor signals, outputs a PWM control signal to the motor drive circuit 30 to control the driving of the electric motor 20 and therefore assist the driver in the steering operation.

The electric power source control portion 62 controls the charging and discharging of the subsidiary electric power source 50 by performing the voltage boost control of the voltage boost circuit 40. The electric power source control portion 62 is connected to the first voltage sensor 51, the second voltage sensor 52, the charge/discharge current sensor 53, and the output current sensor 54, and receives inputs of sensor signals that show the main power source voltage v1, the output power source voltage v2, the actual charge/discharge current isub, and the output current i2. On the basis of these sensor signals, the electric power source control portion 62 outputs a PWM control signal to the voltage boost circuit 40 so that the state of charge of the subsidiary electric power source 50 reaches a target state of charge. The voltage boost circuit 40 changes the boosted voltage, that is, the output voltage of the circuit 40, by controlling the duty ratios of the first and second voltage-boosting switching elements 43, 44 in accordance with the input PWM control signal. Incidentally, the electric power source control portion 62 stops the voltage boost operation of the voltage boost circuit 40 when a fail of the main electric power source 100 has been detected.

Generally, the electric power steering device needs large amounts of electric power at the time of static steering operation, or at the time of operating the steering handle at low vehicle speed, as can be understood from a steering assist control described below. However, it is not preferable to increase the capacity of the main electric power source 100 in preparation for a temporary large electric power consumption. Therefore, the electric power steering device of this embodiment is equipped with the subsidiary electric power source 50 that supplements the source power supply at the time of temporary large electric power consumption, instead of an increased capacity of the main electric power source 100. Besides, in order to efficiently drive the electric motor 20, a system that includes the voltage boost circuit 40, and supplies voltage-boosted power to the motor drive circuit 30 and the subsidiary electric power source 50 is constructed.

By the way, there is possibility of it becoming impossible to supply source power from the main electric power source 100 to the electric motor 20. Examples of the causes of this incident include a failure of the power source relay 107, a break of the drive system power source line 105, a bad connector connection of the power source line, etc. In such a case, the electric power steering device of this embodiment is able to perform the steering assist control to some extent by using only the subsidiary electric power source 50. However, there is a limit to the amount of electric power that can be supplied from the subsidiary electric power source 50. Generally, at the time of electric power source abnormality, an alarm device, such as a warning lamp or the like, operates. However, such an alarm alone is sometimes not sufficient to make the driver aware of it. In such a case, the amount of charge of the subsidiary electric power source 50 dwindles until the control system stops and the steering assist suddenly becomes null, which causes considerable discomfort to the driver.

Therefore, in this embodiment, the steering assist control is switched in accordance with whether the main electric power source 100 is normal or abnormal, in order to make the driver aware that the electric power steering device is abnormal, and restrain the amount of electric power consumption of the electric motor 20 so as to favorably maintain the source power supply from the subsidiary electric power source 50, and maximize the length of the period during which the steering assist is possible.

Figure 2:
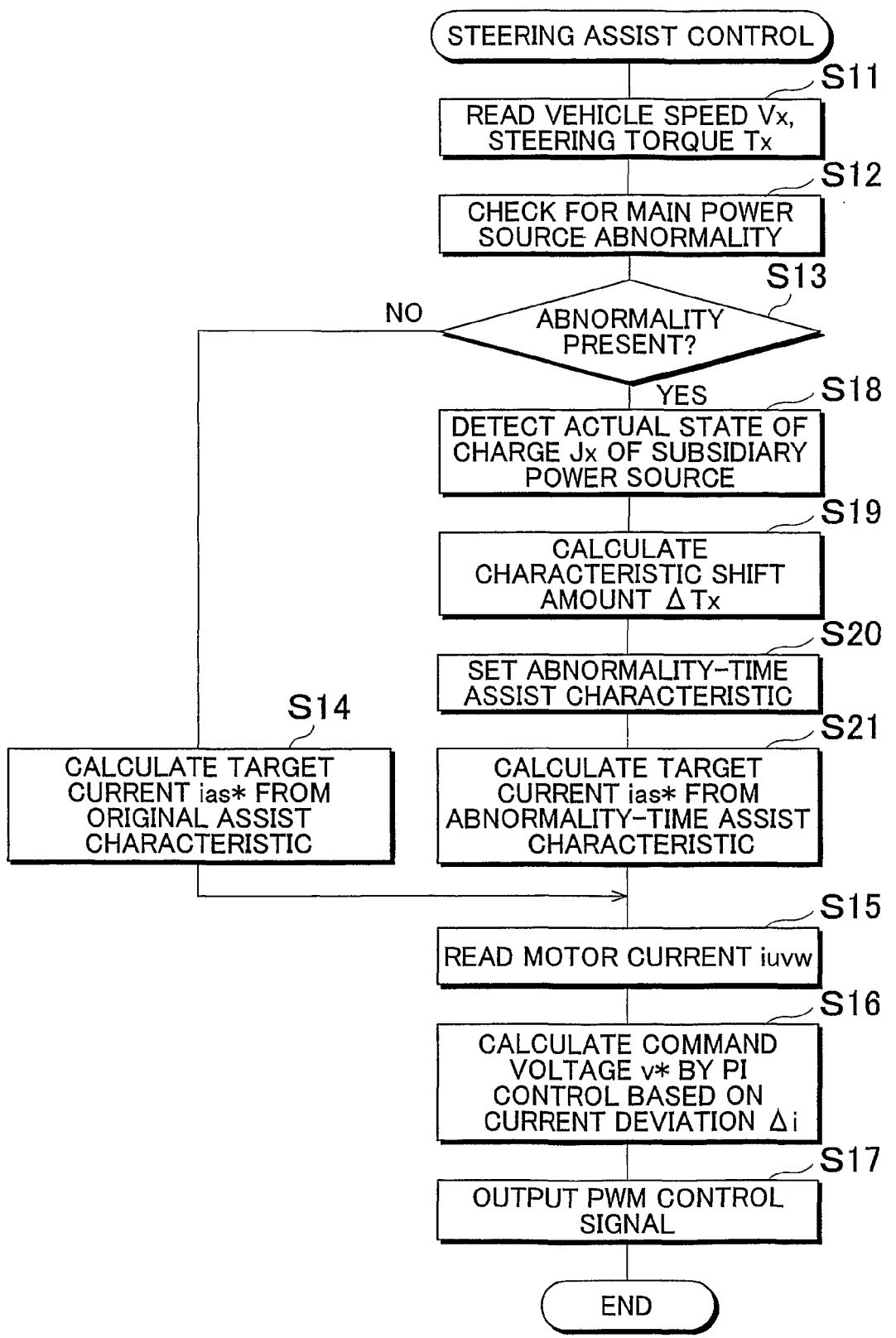
FIG. 2 is a flowchart representing a steering assist control routine in accordance with the first embodiment of the invention.

Herein, a steering assist control process that the assist control portion 61 of the electronic control unit 60 performs will be described. FIG. 2 represents a steering assist control routine carried out by the assist control portion 61. The steering assist control routine is stored as a control program in the ROM of the electronic control unit 60, and is started upon the turning-on of the ignition switch 106, and is repeatedly executed at every predetermined short cycle period.

When the control routine is started, the assist control portion 61 in step S11 reads the vehicle speed Vx detected by the vehicle speed sensor 23, and the steering torque Tx detected by the steering torque sensor 21.

Subsequently in step S12, the assist control portion 61 diagnoses whether or not there is abnormality in the source power supply of the main electric power source 100. In this embodiment, the assist control portion 61 reads the main power source voltage v1 detected by the first voltage sensor 51, via the electric power source control portion 62, and determines whether or not the main power source voltage v1 is below a main electric power source abnormality criterion voltage vref. The source power supply abnormality of the main electric power source 100 refers to a state in which source power cannot be supplied from the main electric power source 100 to the motor drive circuit 30, or a state in which the source power supply cannot be normally performed. Examples of the causes of this abnormality include a failure of the power source relay 107, a break of the drive system power source line 105, a bad connector connection of a power source line, etc. Therefore, if the main electric power source abnormality criterion voltage vref is set beforehand at a low value that is not detected during a normal state, it can be determined that there is a source power supply abnormality of the main electric power source 100 when the main power source voltage v1 is below the main electric power source abnormality criterion voltage vref. A function portion of the assist control portion 61 that performs the process of step S12 is an example of first electric power source abnormality detection means in the invention, and the first voltage sensor 51 is an example of voltage detection means in the invention.

Besides, for the determination of the presence of the source power supply abnormality of the main electric power source 100, the detection of abnormality of the alternator 102 may be added as an OR condition. That is, when at least one of the abnormality of the main power source voltage v1 and the abnormality of the alternator 102 is detected, it is determined that the source power supply abnormality of the main electric power source 100 is present. The alternator 102 adjusts the amount of current that is passed through the field coil, and thereby adjusts the generated voltage. Therefore, the abnormality of the alternator 102 can be detected by, for example, detecting a broken wire of the field coil.

Subsequently in step S13, the assist control portion 61 refers to the result of the diagnosis of the main electric power source 100. If the source power supply abnormality is not present (NO in S13), the process proceeds to step S14. If the source power supply abnormality is present (YES in S13), the process proceeds to step S18. Description will be first made in conjunction with the case where the source power supply abnormality of the main electric power source 100 is not present.

Figure 3:
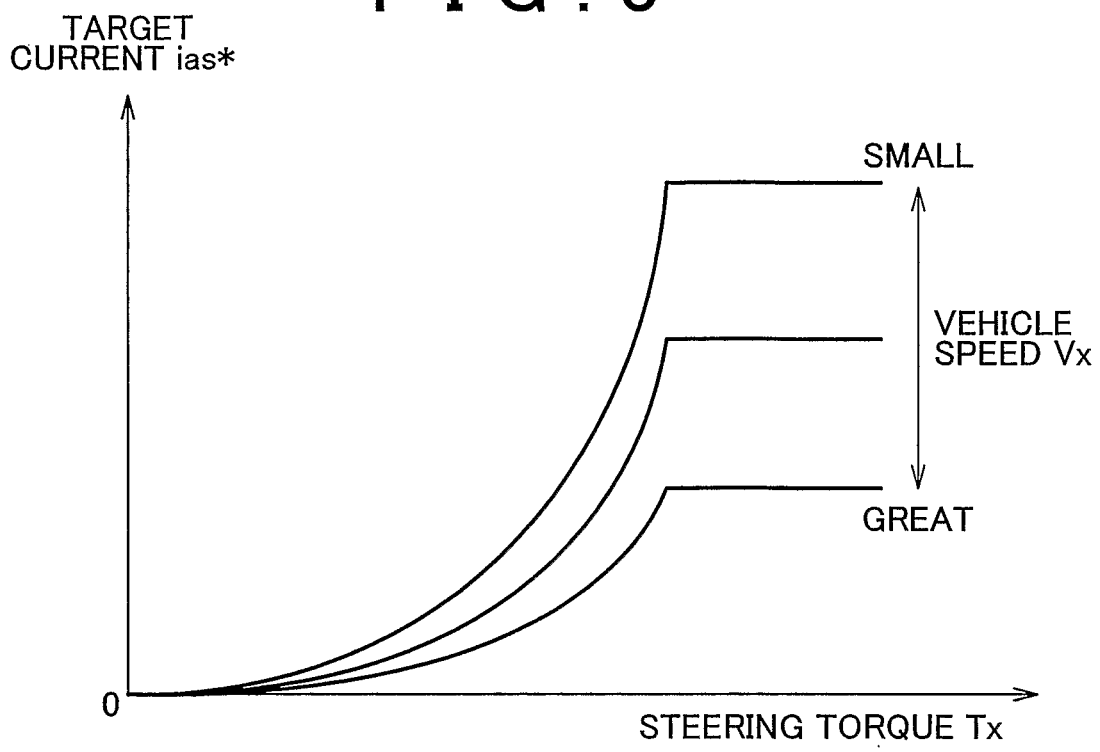
FIG. 3 is a characteristic diagram representing an assist map in accordance with the first embodiment of the invention.

If it is determined that the source power supply abnormality of the main electric power source 100 is not present, the assist control portion 61 calculates, in step S14, a target current value ias* by using the assist map. The assist map is a reference map for setting a target current value ias* of the electric motor 20 on the basis of the vehicle speed Vx and the steering torque Tx, and is stored in the memory of the electronic control unit 60. In the assist map, as shown in FIG. 3, relations between the steering torque Tx and the target current value ias* are set so that the assist force increases with increases in the steering torque Tx. In this example, the relation between the steering torque Tx and the target current value ias* is changed also according to the vehicle speed Vx, and the target current value ias* is set at a value that is larger the lower the vehicle speed Vx. In this assist map, when the steering torque Tx is zero, the target current value ias* is set at zero. Furthermore, the target current value ias* is set so as to increase from zero in accordance with increases in the steering torque Tx. Incidentally, in a region of high steering torques Tx, the target current value ias* is restricted to be less than or equal to an upper-limit current value, irrespective of increases in the steering torque Tx.

This assist map is an example of the assist characteristic in which the relation between the steering torque and the assist force (target current value) is set. Incidentally, the assist map shown in FIG. 3 represents the characteristic of the target current value ias* relative to the steering torque Tx in the rightward direction. As for the characteristic thereof in the leftward direction, merely the direction is opposite, and there is no difference in terms of absolute value from the characteristic shown in FIG. 3. Hereinafter, the target current value ias* will be termed the target current ias*.

The characteristic of the assist map is switched when the source power supply abnormality of the main electric power source 100 is present as described above. Therefore, the characteristic of the main electric power source 100 in the normal state (the characteristic shown in FIG. 3) is termed the original assist characteristic.

Besides, the target current ias* corresponds to a target torque of the electric motor 20. Therefore, in order to factor in the compensating torque based on the steering angle θx, the steering speed ωx, etc., in the calculation of the target current ias*, the target current ias* may be corrected by a corresponding amount. For example, the target current ias* may be corrected to a target value that has factored in an amount corresponding to a compensating torque that is the sum of the returning force of the steering shaft 12 toward a basic position which increases in proportion to the steering angle θx, and a back torque corresponding to the resist force against the rotation of the steering shaft 12 which increases in proportion to the steering speed ωx. For this calculation, the rotation angle of the electric motor 20 (corresponding to the steering angle θx of the steering handle 11) detected by the rotation angle sensor 22 is input. Besides, the steering speed ωx is found by differentiating the steering angle θx of the steering handle 11 with respect to time.

Next, in step S15, the assist control portion 61 reads from the motor current sensor 38 the motor current iuvw that flows through the electric motor 20. Subsequently in step S16, the assist control portion 61 calculates a deviation Δi of this motor current iuvw from the target current ias* having been calculated, and calculates a command voltage v* by a PI control (proportional-plus-integral control) based on the deviation Δi.

Then, in step S17, the assist control portion 61 outputs a PWM control signal commensurate with the command voltage v* to the motor drive circuit 30. After that, the assist control portion 61 temporarily ends the control routine. This control routine is repeatedly executed at every predetermined short cycle period. Therefore, through the execution of the control routine, the duty ratios of the switching elements 31 to 36 of the motor drive circuit 30 are adjusted to control the driving of the electric motor 20 so that a desired steering assist force according to the driver's steering operation is obtained. The assist control portion 61 and the motor drive circuit 30 are examples of motor control means in the invention.

Incidentally, the foregoing feedback control of the electric motor 20 is performed by a vector control that is represented by a two-phase d-q-axis coordinate system in which the q axis represents the rotating direction of the electric motor 20 and the d axis represents the direction orthogonal to the rotating direction. Therefore, the assist control portion 61 is equipped with a 3-phase/2-phase coordinate converter (not shown) that converts the three-phase motor current iuvw detected by the motor current sensor 38 into values in the d-q-axis coordinate system. Using the 3-phase/2-phase coordinate converter, the assist control portion 61 converts the motor current iuvw into the d-axis current Id and the q-axis current Iq. Besides, in the setting of a target current ias*, too, the assist control portion 61 calculates a target current (Id*, Iq*) in the d-q-axis coordinate system. In this case, the q-axis current that causes the electric motor 20 to generate torque is set as a target current ias* from the assist map. Besides, in order to calculate a three-phase voltage command value (command voltage v*) that corresponds to the deviation (Id*-Id, Iq*-Iq), the assist control portion 61 is equipped with a 2-phase/3-phase coordinate conversion portion (not shown). Using the 2-phase/3-phase coordinate conversion portion, the assist control portion 61 calculates a three-phase command voltage v*.

In this embodiment, for the sake of easy and simple description, the representations in the d-q-axis coordinate system are not used, and the target current is represented simply as ias*, and the motor current detected by the motor current sensor 38 is represented as iuvw.

Referring back to the flowchart of the steering assist control shown in FIG. 2, a process performed in the case where the source power supply abnormality of the main electric power source 100 is present will be described. If the assist control portion 61 determines that the source power supply abnormality of the main electric power source 100 is present (YES in S13), the assist control portion 61 detects the actual amount of charge Jx of the subsidiary electric power source 50 in step S18. The actual amount of charge Jx of the subsidiary electric power source 50 represents the amount of charge stored in the subsidiary electric power source 50, and is successively detected through an actual-amount-of-charge detecting routine described below. Therefore, the process of step S18 is a process of reading the actual amount of charge Jx detected by the actual-amount-of-charge detecting routine that is executed by the electric power source control portion 62. The actual amount of charge Jx of the subsidiary electric power source 50 represents the source power supply capability of the subsidiary electric power source 50. Therefore, a function portion of the assist control portion 61 that executes step S18, and a function portion of the electric power source control portion 62 that executes the below-described actual-amount-of-charge detecting routine are examples of second source power supply capability detection means in the invention.

Figure 4:
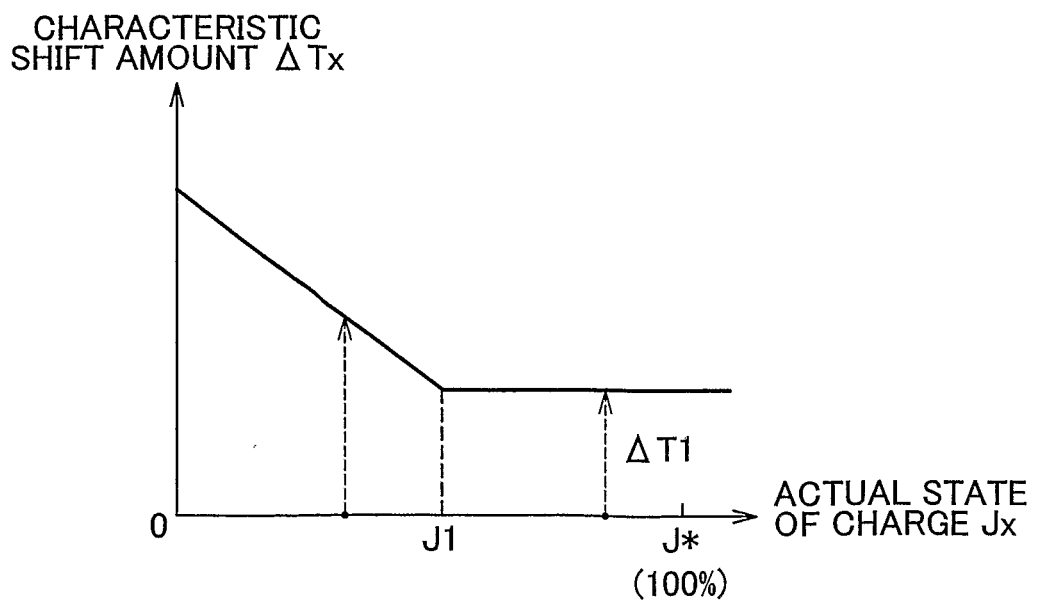
FIG. 4 is a characteristic diagram representing a shift amount map in accordance with the first embodiment of the invention.

Subsequently in step S19, the assist control portion 61 calculates a characteristic shift amount ΔTx on the basis of the actual amount of charge Jx of the subsidiary electric power source 50. The characteristic shift amount ΔTx is calculated by using a shift amount map. In the shift amount map, as shown in FIG. 4, a relation between the actual amount of charge Jx of the subsidiary electric power source 50 and the characteristic shift amount ΔTx is set. The shift amount map is stored in the memory of the electronic control unit 60. As for the characteristic shift amount ΔTx, in the case where the actual amount of charge Jx is greater than or equal to a reference amount of charge J1, a fixed characteristic shift amount ΔT1 (>0) is set as shown in the shift amount map. In the case where the actual amount of charge Jx is below the reference amount of charge J1, the characteristic shift amount ΔTx is set so as to increase with declines in the actual amount of charge Jx. Incidentally, the reference amount of charge J1 is set at a value that is smaller than a target amount of charge J* described below.

Figure 5:
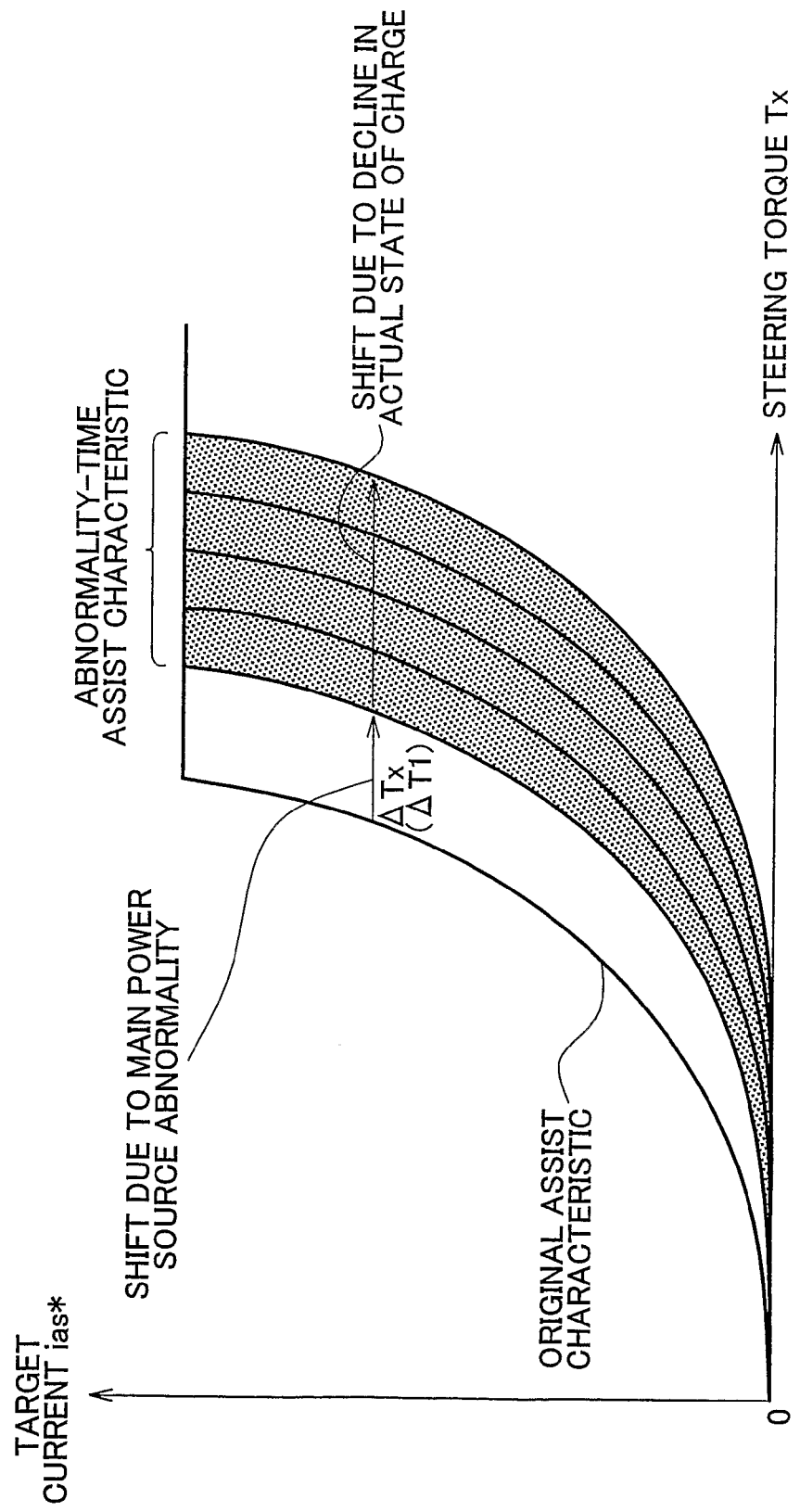
FIG. 5 is a characteristic diagram showing transition of assist maps in accordance with the first embodiment of the invention.

Subsequently in step S20, the assist control portion 61 switches the assist characteristic in the assist map shown in FIG. 3 from the original assist characteristic to an abnormality-time assist characteristic by using the characteristic shift amount $\Delta Tx$. The abnormality-time assist characteristic is a characteristic obtained by shifting the steering torque Tx by the characteristic shift amount $\Delta Tx$ to an increase side (in the direction indicated by arrows) from the original assist characteristic, as shown in the assist map of FIG. 5. The abnormality-time assist characteristic is a characteristic obtained by shifting the values of the steering torque Tx relative to the target currents ias* in the assist map by the characteristic shift amount $\Delta Tx$ to the increase side. In this case, the torque region in which the target current ias* is set at zero expands by the amount of the shift of the steering torque Tx from the point of origin of the assist map. The original assist characteristic refers to the assist characteristic that is used when the main electric power source 100 is normal.

Besides, the original assist characteristic in the embodiment is set according to the vehicle speed Vx, and therefore the abnormality-time assist characteristic is also set according to the vehicle speed Vx. Therefore, in the assist map shown in FIG. 5, the original assist characteristic at a certain vehicle speed Vx, and the abnormality-time assist characteristic at the same vehicle speed Vx which is changed according to the characteristic shift amount are represented in a superimposed fashion.

Subsequently in step S21, the assist control portion 61 calculates a target current ias* relative to the steering torque Tx, from the abnormality-time assist characteristic. In this case, the target current ias* for the steering torque Tx is less than the target current for the same steering torque Tx that is calculated when the main electric power source 100 is normal, by an amount commensurate with the alteration of the assist characteristic.

After calculating the target current ias* in step S21, the assist control portion 61 calculates the command voltage v* by the PI control based on the deviation $\Delta i$ of the motor current iuvw from the target current ias*, and outputs the PWM control signal commensurate with the command voltage v* to the motor drive circuit 30. After that, the control routine temporarily ends.

This control routine is repeatedly executed at every predetermined short cycle period. In this manner, immediately after the source power supply abnormality of the main electric power source 100 is detected, the original assist characteristic is switched to an abnormality-time assist characteristic commensurate with the actual amount of charge Jx that the subsidiary electric power source 50 then has. In this case, even if the actual amount of charge Jx of the subsidiary electric power source 50 is close to a fully charged state (the target amount of charge J*), the assist characteristic is altered by the reference shift amount $\Delta T1$ (see FIG. 5). This ensures that the target current ias* corresponding to the steering torque Tx will be reduced. Therefore, the assist force decreases, and the steering handle operation becomes relatively heavy. At the same time, the electric power supplied from the subsidiary electric power source 50 to the motor drive circuit 30 also lessens, so that the source power supply from the subsidiary electric power source 50 is favorably maintained.

The switching of the assist characteristic immediately following the detection of the source power supply abnormality of the main electric power source 100 is performed within a short time. Therefore, the switching of the assist characteristic can be effectively caused to be felt by the driver, without a need to considerably enlarge the characteristic shift amount $\Delta Tx$ at the time of switch of the assist characteristic, that is, without a need to considerably enlarge the amount of reduction in the assist force. As a result, the driver will be aware of the abnormality of the electric power steering device at this time point. Besides, at this time point, the assist force may become weaker, but the assist force does not reduce to such an extent as to greatly affect the steering operation, since the actual amount of charge Jx of the subsidiary electric power source 50 is kept at or above the reference amount of charge J1 by a charge/discharge control described below.

In the case where the source power supply abnormality of the main electric power source 100 is detected, the charge/discharge control (described below) of the subsidiary electric power source 50 by the electric power source control portion 62 is stopped, and the performance of the voltage-boosting operation of the voltage boost circuit 40 is avoided. Therefore, the electric motor 20 is driven only by the electric power that the subsidiary electric power source 50 possesses. Therefore, the actual amount of charge Jx that the subsidiary electric power source 50 possesses gradually declines. In accordance with declines in the actual amount of charge Jx of the subsidiary electric power source 50, the abnormality-time assist characteristic is altered so that the values of the steering torque Tx relative to the target current ias* are shifted to the increase side and the assist force obtained corresponding to the steering operation declines (see FIG. 5).

Thus, in the embodiment, immediately after the source power supply abnormality of the main electric power source 100 is detected, the assist characteristic is instantaneously switched from the original assist characteristic to the abnormality-time assist characteristic. After that, the abnormality-time assist characteristic is altered so that the assist force relative to the steering torque Tx further declines with declines in the actual amount of charge Jx of the subsidiary electric power source 50.

Therefore, the driver feels that the assist force having weakened once further weakens, that is, the steering handle operation becomes further heavier, as time elapses. With this, the driver can anticipate that the abnormality of the electric power steering device is progressing. Therefore, a complete stop of the steering assist, if occurs, will not surprise the driver. Besides, since the electric power consumption of the subsidiary electric power source 50 is restrained and the source power supply is favorably maintained, the period during which the steering assist is possible can be elongated. Besides, since the electric power of the main electric power source 100 is not used to drive the electric motor 20, the electric power to from the main electric power source 100 can be preferentially supplied to other vehicle-mounted electrical loads.

Besides, the switching and the alteration of the assist characteristic are carried out not by multiplying the target current ias* by a reduction coefficient, but by shifting the values of the steering torque Tx relative to the target currents ias* to the increase side. Hence, the region of the steering torque in which the target current ias* is zero expands. Therefore, the driver can easily recognize the changing of the assist characteristic even when gently operating the steering handle.

Besides, in the case where the actual amount of charge Jx of the subsidiary electric power source 50 is below the reference amount of charge J1 immediately after the source power supply abnormality of the main electric power source 100 is detected, the characteristic shift amount $\Delta Tx$ that is larger than the reference shift amount $\Delta T1$ is set. Therefore, the maintenance of the source power supply from the subsidiary electric power source 50 can be appropriately performed.

In this embodiment, a function portion of the assist control portion 61 that performs the assist characteristic switching process (S19, S20) immediately following the detection of the source power supply abnormality of the main electric power source 100 is an example of assist characteristic switch means in the invention. Besides, a function portion of the assist control portion 61 that, following the assist characteristic switching process, performs the process (S18 to S20) of altering the abnormality-time assist characteristic in accordance with declines in the actual amount of charge Jx of the subsidiary electric power source 50 is an example of assist characteristic alteration means in the invention.

Although in the embodiment, the assist characteristic is switched from the original assist characteristic to the abnormality-time assist characteristic during one cycle period of the control routine, some more time can be taken to switch the assist characteristic if the time-dependent rate of change of the assist characteristic is large. In that case, too, the time-dependent rate of alteration of the assist characteristic immediately following the detection of the source power supply abnormality of the main electric power source 100 (the amount of change in the characteristic shift amount $\Delta Tx$ per unit time) is set so as to be larger than the time-dependent rate of alteration of the assist characteristic which subsequently occurs.

Next, the charge/discharge control of the subsidiary electric power source 50 will be described. The electric power steering device of this embodiment incorporates the electric power supply device made up of the main electric power source 100 and the subsidiary electric power source 50, and can deliver the full performance of assist by using both the main electric power source 100 and the subsidiary electric power source 50. Therefore, in order to secure the primary assist performance of the electric power steering device, it is necessary to keep a good state of the subsidiary electric power source 50. If the subsidiary electric power source 50 is excessively charged, or frequently charged and discharged repeatedly, the subsidiary electric power source 50 quickly degrades, and the service life thereof shortens. Besides, in the case where the amount of charge of the subsidiary electric power source 50 is in sufficient or short, the primary assist performance cannot be delivered. Therefore, in this embodiment, the charge/discharge of the subsidiary electric power source 50 is controlled as described below.

Figure 6:
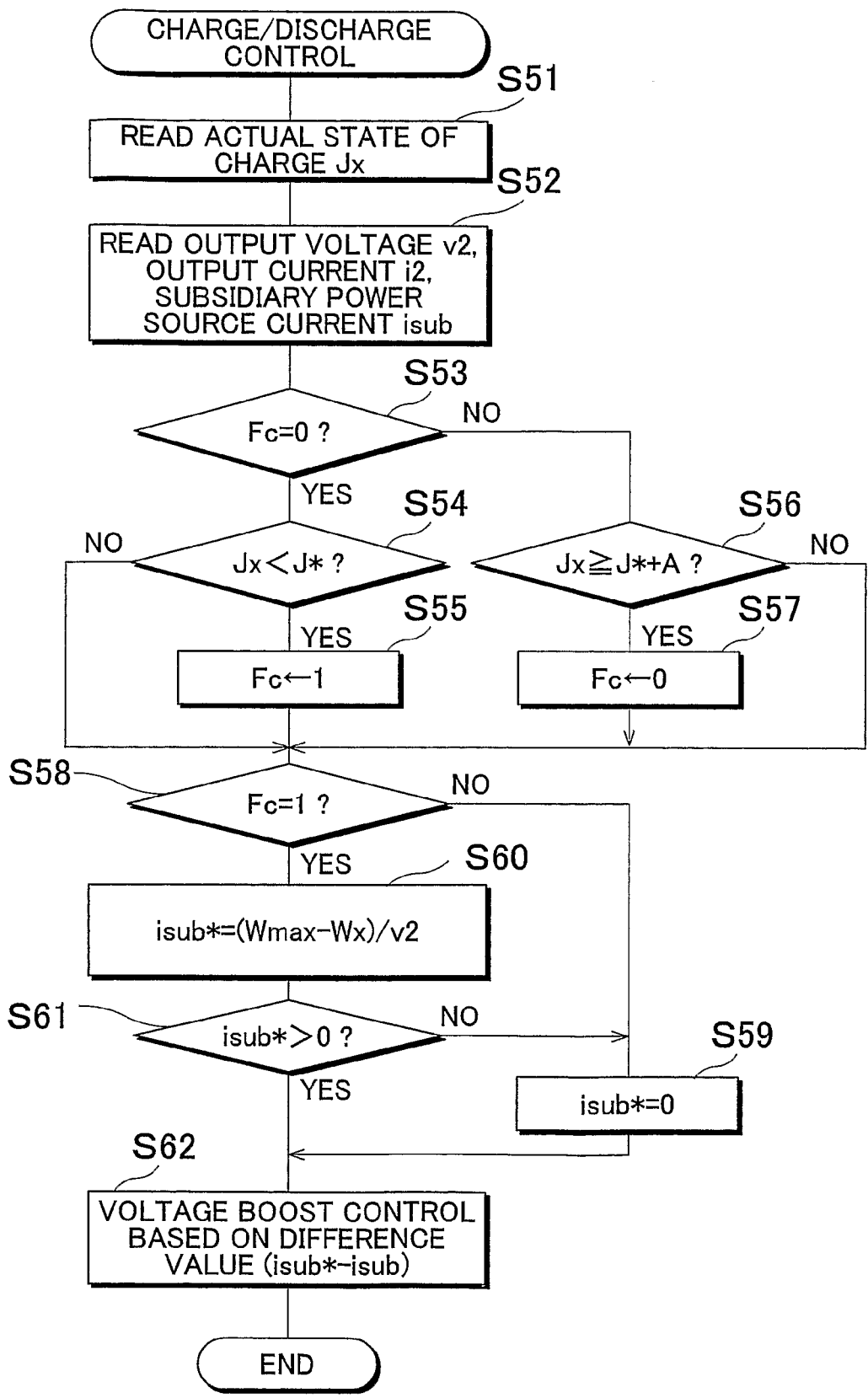
FIG. 6 is a flowchart representing a charge/discharge control routine in accordance with the first embodiment of the invention.

FIG. 6 represents a charge/discharge control routine that is carried out by the electric power source control portion 62. This charge/discharge control routine is stored as a control program in the ROM of the electronic control unit 60, and is started upon the turning-on of the ignition switch 106, and is repeatedly executed at every predetermined short cycle period.

When the control routine is started, the electric power source control portion 62 firstly in step S51 reads data that represents the actual amount of charge Jx of the subsidiary electric power source 50. The actual amount of charge Jx is successively calculated by an actual-amount-of-charge detecting routine (FIG. 7) described below. Therefore, step S51 is a process of reading data that represents the latest actual amount of charge Jx calculated by the actual-amount-of-charge detecting routine.

Subsequently in step S52, the electric power source control portion 62 reads the output voltage v2 detected by the second voltage sensor 52, the output current i2 detected by the output current sensor 54, and the subsidiary power source current isub detected by the subsidiary power source current sensor 53. Subsequently in step S53, the electric power source control portion 62 determines whether or not a charge flag Fc has been set at "0". The charge flag Fc, as can be understood from a below-described process, represents the presence/absence of the need to charge the subsidiary electric power source 50; specifically, Fc=0 represents that the charging is not needed, and Fc=1 represents that the charging is needed. Incidentally, the charge flag Fc is "0" when the charge/discharge control routine is started.

If the charge flag Fc is "0" (YES in S53), the process proceeds to step S54, in which the electric power source control portion 62 determines whether or not the actual amount of charge Jx is less than the target amount of charge J*. This step S54 is a process of determining whether or not the amount of charge of the subsidiary electric power source 50 has become short. If Jx<J* (YES in S54), the electric power source control portion 62 sets the charge flag Fc to "1" in step S55. On the other hand, if Jx≧J* (NO in S54), the electric power source control portion 62 determines that the amount of charge has not become short, and therefore does not change the setting of the charge flag Fc. Therefore, the charge flag Fc is kept at "0".

If in step S53 it is determined that the charge flag Fc is "1" (NO in S53), the process proceeds to step S56, in which the electric power source control portion 62 determines whether or not the actual amount of charge Jx has reached an amount of charge (J*+A) that is obtained by adding a dead zone value A (positive value) to the target amount of charge J*. This step S56 is a process of determining whether or not the charge shortage of the subsidiary electric power source 50 has been dissolved. If Jx≧J*+A (YES in S56), the electric power source control portion 62 determines that the charge shortage has been dissolved, and then sets the charge flag Fc to "0" in step S57. On the other hand, if Jx<J*+A (NO in S56), the electric power source control portion 62 determines that the amount of charge is short, and does not change the setting of the charge flag Fc. Therefore, the charge flag Fc is kept at "1". The dead zone, value A is set so that the result of the determination in the comparison between the actual amount of charge Jx and the target amount of charge J* (the presence/absence of the need for the charging) does not frequently fluctuate.

Besides, the target amount of charge J* may be a pre-set constant value, and may also be set otherwise, for example, in such a manner as to decline in accordance with increases in the vehicle speed Vx. This is because the higher the vehicle speed Vx, the less the electric power needed for the steering assist control.

After the charge flag Fc is set in this manner, the electric power source control portion 62 checks the set status of the charge flag Fc in step S58. If the charge flag Fc is "0" (NO in S58), that is, if it is determined that the charging of the subsidiary electric power source 50 is not needed, the process proceeds to step S59, in which the electric power source control portion 62 sets a target charge/discharge current isub* to zero (isub*=0). On the other hand, if the charge flag Fc is "1" (YES in S58), that is, if it is determined that the amount of charge of the subsidiary electric power source 50 is short, the process proceeds to step S60, in which the electric power source control portion 62 finds a target charge/discharge current isub* by calculation as follows:

$$i\text{sub}^* = (W\text{max} - Wx)/v2$$

In the foregoing equation, Wmax is the output allowable electric power of the voltage boost circuit 40, and Wx is the electric power consumption (the electric power consumed by driving the motor drive circuit 30), and v2 is the output voltage detected by the second voltage sensor 52. The output allowable electric power Wmax is a value pre-set on the basis of the standards of the voltage boost circuit 40. Besides, the electric power consumption Wx of the motor drive circuit 30 is calculated by multiplication of the output voltage v2 detected by the second voltage sensor 52 and the output current i2 detected by the output current sensor 54.

Subsequently in step S61, the electric power source control portion 62 determines whether or not the target charge/discharge current isub* is a positive value. As described above, the target charge/discharge current isub* is obtained by subtracting the electric power consumption Wx of the motor drive circuit 30 from the output allowable electric power Wmax of the voltage boost circuit 40 and then dividing the remainder by the output voltage v2. Therefore, if the electric power consumption Wx of the electric motor 20 within the range of the output allowable electric power Wmax of the voltage boost circuit 40, then isub*>0 (YES in S61). On the other hand, if the electric power consumption Wx of the motor drive circuit 30 is greater than or equal to the output allowable electric power Wmax of the voltage boost circuit 40, isub*≦0 (NO in S61).

If the target charge/discharge current isub* is less than or equal to zero (isub*≦0), the electric power source control portion 62 newly sets the target charge/discharge current isub* to zero (isub*=0) in step S59. On the other hand, if the target charge/discharge current isub* is a positive value (isub*>0), the electric power source control portion 62 does not change the target charge/discharge current isub* calculated before in step S60.

After setting the target charge/discharge current isub* in this manner, the electric power source control portion 62 proceeds to step S62. In step S62, the electric power source control portion 62 performs a feedback control of the boosted voltage of the voltage boost circuit 40 on the basis of a deviation between the target charge/discharge current isub* and the subsidiary power source current isub. That is, the electric power source control portion 62 feeds back the subsidiary power source current isub detected by the subsidiary power source current sensor 53, and controls the boosted voltage of the voltage boost circuit 40 so that the deviation between the target charge/discharge current isub* and the subsidiary power source current isub (isub*-isub) lessens. In this embodiment, a PID control based on the deviation (isub*-isub) is performed.

The electric power source control portion 62 boosts the voltage of the electric power supplied from the main electric power source 100 by outputting the pulse signals of a predetermined period to the gates of the first and second voltage-boosting switching elements 43, 44 of the voltage boost circuit 40 and therefore turning on and off the two switching elements 43, 44. In this case, the boosted voltage is controlled by altering the duty ratio of the pulse signals.

After performing the process of step S62, the electric power source control portion 62 temporarily ends the charge/discharge control routine. The charge/discharge control routine is repeatedly executed at every predetermined short cycle period. Incidentally, if the source power supply abnormality of the main electric power source 100 is detected in the steering assist control, the electric power source control portion 62 does not carry out the charge/discharge control routine. Therefore, the operation of the voltage boost circuit 40 is stopped, so that the charging of the subsidiary electric power source 50 is not performed.

According to this charge/discharge control routine, if the target charge/discharge current isub* is a positive value (isub>0), the voltage boost control is performed so that current flows through the subsidiary electric power source 50 in the charging direction and so that the magnitude of the current becomes equal to the target charge/discharge current isub*. Therefore, the boosted voltage output from the voltage boost circuit 40 is controlled so as to be higher than the power source voltage of the subsidiary electric power source 50. That is, the subsidiary electric power source 50 is charged with electric power from the main electric power source 100 via the voltage boost circuit 40 in the case where the actual amount of charge Jx is less than the target amount of charge J* and where the output of the voltage boost circuit 40 has a margin over the electric power consumption of the motor drive circuit 30 (the electric power consumed to drive the electric motor 20). Besides, since the target charge/discharge current isub* is set so that after the amount of electric power supplied to the motor drive circuit 30 is secured the subsidiary electric power source 50 is charged by fully using the source power supply capability of the voltage boost circuit 40, the subsidiary electric power source 50 can be quickly charged.

On the other hand, in the case where the target charge/discharge current isub* is set zero (isub*=0), the boosted voltage of the voltage boost circuit 40 is controlled so that neither the charge current nor the discharge current flows through the subsidiary electric power source 50. Therefore, the boosted voltage of the voltage boost circuit 40 is controlled so as to be equal to the power source voltage of the subsidiary electric power source 50. Therefore, the subsidiary electric power source 50 is not charged. Besides, while the electric power consumption of the motor drive circuit 30 does not exceed the output capability of the voltage boost circuit 40, the boosted voltage is maintained so that discharge current does not flow from the subsidiary electric power source 50, and the motor drive circuit 30 operates only on the output electric power of the voltage boost circuit 40. Then, if the electric power consumption of the motor drive circuit 30 reaches an output capability limit of the voltage boost circuit 40, the discharge current of the subsidiary electric power source 50 cannot be maintained at zero despite the voltage boost control, and therefore the boosted voltage declines. Therefore, the amount of shortage in electric power is supplied from the subsidiary electric power source 50 to the motor drive circuit 30. That is, while the electric power consumption of the motor drive circuit 30 is within the output capability range of the voltage boost circuit 40, electric power of the subsidiary electric power source 50 is not used. Only when a large amount of large electric power that exceeds the output performance), source power is supplied to the motor drive circuit 30 from the main electric power source 100 and the subsidiary electric power source 50 as well.

Figure 7:
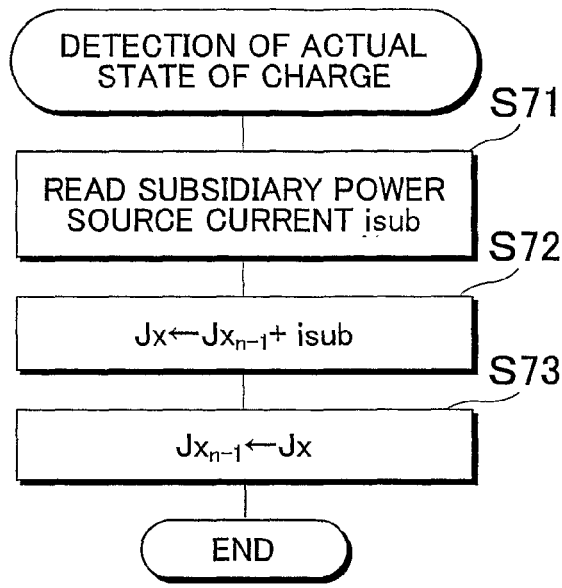
FIG. 7 is a flowchart representing an actual-amount-of-charge detecting routine in accordance with the first embodiment of the invention.

Next, an actual-amount-of-charge detecting process will be described. FIG. 7 represents an actual-amount-of-charge detecting routine that is carried out by the electric power source control portion 62, and is stored as a control program in the ROM of the electronic control unit 60. The actual-amount-of-charge detecting routine is started upon the turning-on of the ignition switch 106, and is repeatedly executed at every predetermined short cycle period. The actual amount of charge detected by the actual-amount-of-charge detecting routine is the actual amount of charge Jx that is read in step S18 of the steering assist control routine, and in step S51 of the charge/discharge control routine.

When the actual-amount-of-charge detecting routine is started, the electric power source control portion 62 reads, in step S71, the subsidiary power source current isub detected by the subsidiary power source current sensor 53. Subsequently in step S72, the electric power source control portion 62 finds a present-time actual amount of charge Jx by calculation as follows: Jx=Jxn−1+isub, where Jxn−1 is the previously found actual amount of charge. The previous actual amount of charge represents the actual amount of charge Jx found one cycle before in the actual-amount-of-charge detecting routine that is repeated at every predetermined cycle period.

In this embodiment, when the ignition switch 106 is turned off, the charges stored in the subsidiary electric power source 50 are discharged to the main battery 101. Therefore, when this detection routine is started, the actual amount of charge Jx of the subsidiary electric power source 50 is at a substantially constant small value. Therefore, a pre-set fixed value (e.g., Jxn−1=0) is used as an initial value of the previous actual amount of charge Jxn−1.

Subsequently in step S73, the electric power source control portion 62 stores the present-time actual amount of charge Jx as the previous actual amount of charge Jxn−1 into the RAM, and temporarily ends the actual-amount-of-charge detecting routine. The actual-amount-of-charge detecting routine is repeatedly executed at every predetermined short cycle period. Therefore, the presently calculated actual amount of charge Jx is used as the previous actual amount of charge Jxn−1 in step S72 in the next cycle (one cycle later).

The electric power source control portion 62 finds the actual amount of charge Jx as an integrated value of the subsidiary power source current isub by repeatedly performing the foregoing process during the on-state of the ignition switch 106. In this case, when the charge current is flowing, the integration of the subsidiary power source current isub is performed toward a side of increasing the actual amount of charge Jx of the subsidiary electric power source 50. When the discharge current is flowing, the integration is performed toward a side of decreasing the actual amount of charge Jx of the subsidiary electric power source 50. Therefore, the amount of charge that the subsidiary electric power source 50 has can be properly detected.

Next, a control of discharging charges stored in the subsidiary electric power source 50 will be described. In the case where a capacitor is used as the subsidiary electric power source 50 and where the subsidiary electric power source 50 is not used for a long time, release of the charges from the subsidiary electric power source 50 increases the service life thereof. Besides, in the case where the actual amount of charge Jx of the subsidiary electric power source 50 is detected on the basis of the integrated value of the subsidiary power source current isub, it is difficult to estimate the initial value of the amount of charge at the time of starting up the vehicle. Therefore, in this embodiment, when the ignition switch 106 becomes off, the charges stored in the subsidiary electric power source 50 are discharged into the main battery 101 via the voltage boost circuit 40. The control process for this will be described below with reference to FIG. 8.

Figure 8:
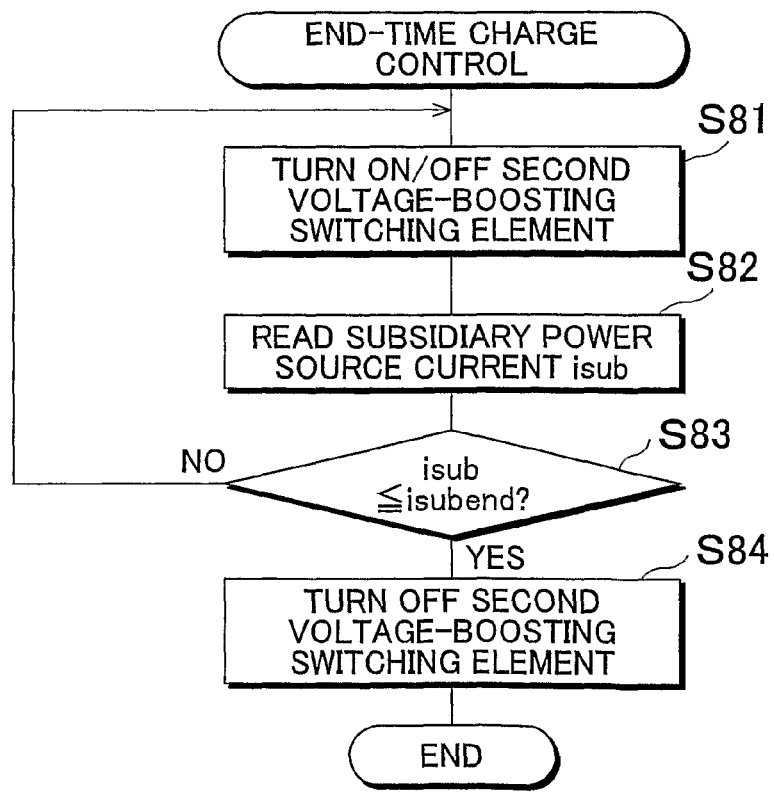
FIG. 8 is a flowchart representing an end-time discharge control routine in accordance with the first embodiment of the invention.

FIG. 8 represents an end-time discharge control routine that is executed by the electric power source control portion 62, and is stored as a control program in the RAM of the electronic control unit 60. The end-time discharge control routine is started when the turning-off operation of the ignition switch 106 is detected. When this control routine is started, the electric power source control portion 62, in step S81, outputs predetermined-frequency pulse signal to the gate of the second voltage-boosting switching element 44 of the voltage boost circuit 40 so as to turn on and off the second voltage-boosting switching element 44 at a predetermined duty ratio. During a period during which the ignition switch 106 is off, the steering assist control has already ended, so that the switching elements 31 to 36 of the motor drive circuit 30 are maintained in an off-state. Therefore, the charges of the subsidiary electric power source 50 are discharged toward the main battery 101. In this case, the magnitude of the discharge current flowing from the subsidiary electric power source 50 to the main battery 101 can be controlled by appropriately setting the duty ratio of the second voltage-boosting switching element 44. Incidentally, the first voltage-boosting switching element 43 is maintained in the off-state.

Subsequently in step S82, the electric power source control portion 62 reads the subsidiary power source current isub (value of current in the discharge direction) measured by the subsidiary power source current sensor 53. Then, in step S83, the electric power source control portion 62 determines whether or not the subsidiary power source current isub has declined to or below a discharge stop criterion current isubend. As the discharge stop criterion current isubend, for example, 0 ampere is set.

While the subsidiary power source current isub has not declines to or below the discharge stop criterion current isubend, the process of steps S81 to S83 is repeatedly performed. During this period, the discharge from the subsidiary electric power source 50 to the main battery 101 is continued. Then, when the subsidiary power source current isub declines to or below the discharge stop criterion current isubend (e.g., if the discharge current stops flowing), the electric power source control portion 62 turns off the second voltage-boosting switching element 44 in step S84 to end the end-time discharge control routine.

Hence, according to the end-time discharge control routine, the service life of the subsidiary electric power source 50 can be increased. Besides, the detection of the actual amount of charge following the turning-on of the ignition switch 106 can be performed with good precision. That is, at the time of detection of the actual amount of charge, the charge/discharge current flowing through the subsidiary electric power source 50 is integrated to calculate the actual state of the charge/discharge current. The estimation of the initial amount of charge at the time of start is difficult. Therefore, the detection error due to variations in the initial amount of charge can be restrained by performing the actual-amount-of-charge detecting process after discharging charges from the subsidiary electric power source 50. Besides, since the magnitude of the discharge current to the main battery 101 can be controlled by utilizing the voltage boost circuit 40, there is no need to specially provide a discharging circuit, and therefore a cost increase is not caused.

Figure 9:
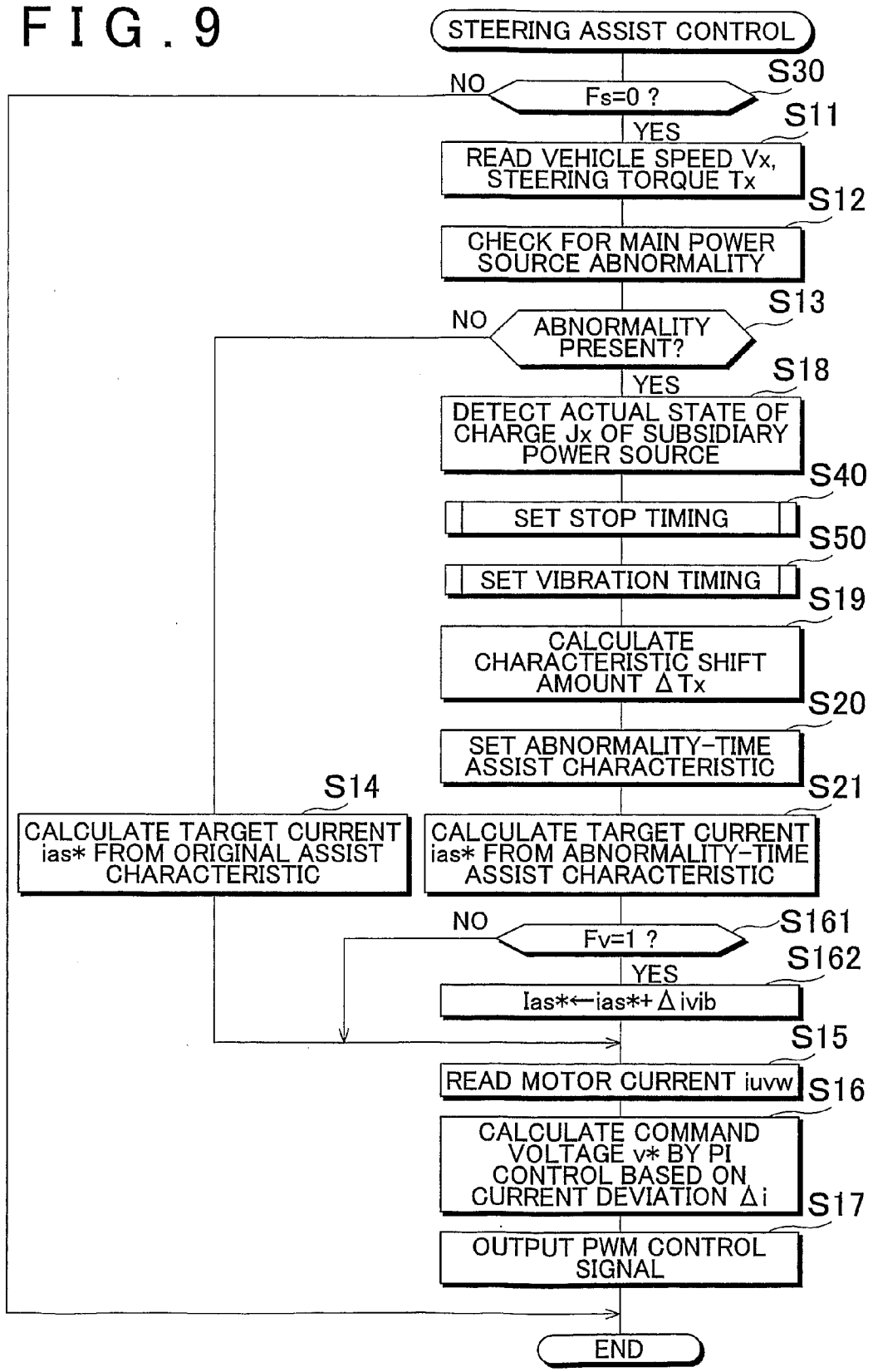
FIG. 9 is a flowchart representing a steering assist control routine in accordance with a second embodiment of the invention.

Next, a second embodiment will be described. In the second embodiment, the steering assist control is changed from that in the first embodiment, and other constructions are the same as those in the first embodiment. FIG. 9 represents a steering assist control routine according to the second embodiment. This steering assist control routine has processes of steps S30, S40, S50, S161, S162 in addition to the steering assist control routine of the first embodiment. Therefore, the same processes as those in the first embodiment are represented by the same step numbers in the drawing, and the descriptions thereof will be omitted below.

When the steering assist control routine is started, it is firstly determined in step S30 whether or not a stop flag Fs is at "0". The stop flag Fs is set at "0" when this routine is started, and is set at "1" by a stop timing setting process (S40) described below. If the stop flag Fs is "0", the process starting with step S11 is immediately executed. On the other hand, if the stop flag Fs is "1", the control routine is immediately exited. That is, the stop flag Fs substantially stops the steering assist control when the value thereof is set to "1".

Figure 10:
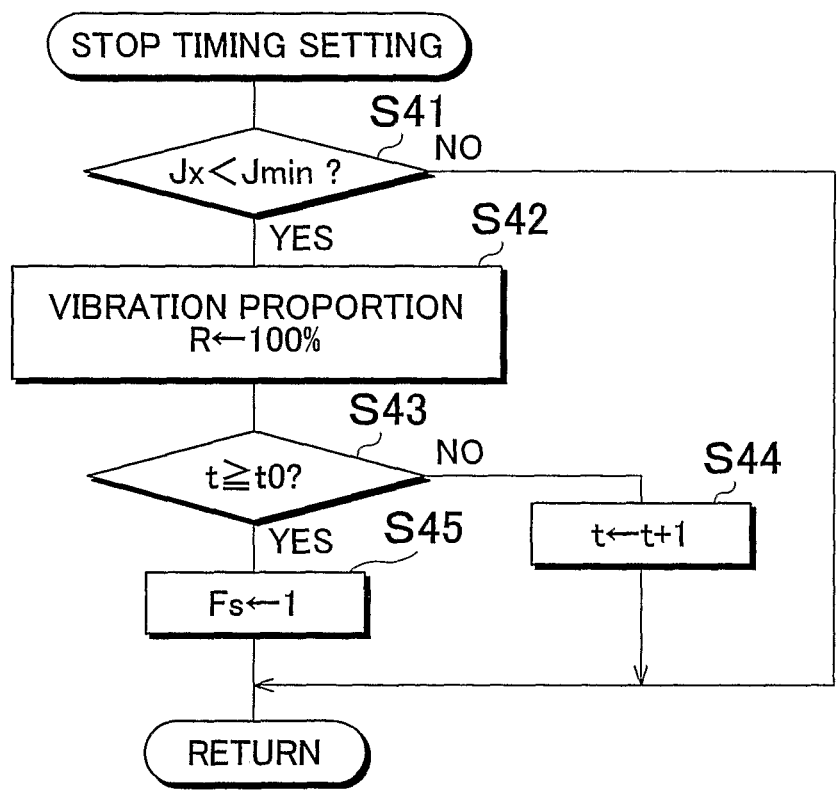
FIG. 10 is a flowchart a stop timing setting routine in accordance with the second embodiment of the invention.

The stop timing setting process in which the stop flag Fs is set to "1" will be described. The stop timing setting process is executed as the process of step S40 after the process of step S18. The stop timing setting process is executed following the flowchart shown in FIG. 10.

Figure 14:
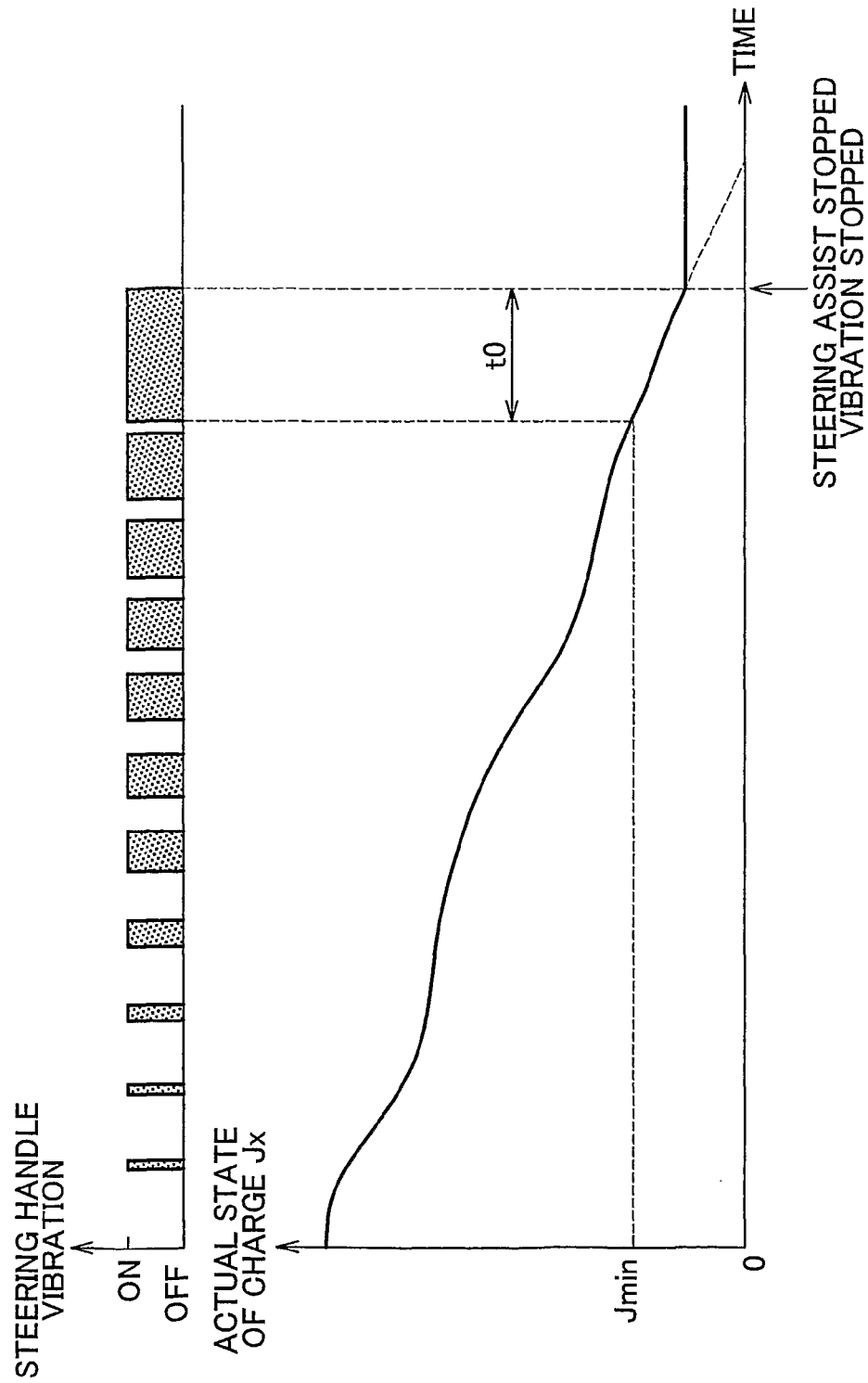
FIG. 14 is a graph representing transitions of the actual amount of charge of the power source and the vibration proportion in accordance with the second embodiment of the invention.

Firstly in step S41, the assist control portion 61 determines whether or not the actual amount of charge Jx that the subsidiary electric power source 50 possesses is below a pre-set stop criterion amount of charge Jmin. If the actual amount of charge Jx is not below the stop criterion amount of charge Jmin, the assist control portion 61 immediately exits this process, and moves to the subsequent process of step S50. In the case of the source power supply abnormality of the main electric power source 100, the subsidiary electric power source 50 is not charged, but provides its own stored electric power to be consumed in driving the electric motor 20. Therefore, the actual amount of charge Jx that the subsidiary electric power source 50 possesses gradually declines as time elapses, as shown in FIG. 14. Then, when the actual amount of charge Jx falls below the stop criterion amount of charge Jmin (YES in S41), the assist control portion 61 sets a vibration proportion R to 100% in step S42. The vibration proportion R represents the proportion of the duration during which the steering handle 11 is vibrated, and will be described in detail in conjunction with a vibration timing setting process below.

Subsequently in step S43, the assist control portion 61 reads the value of a clock timer, and determines whether or not the timer value t has reached a predetermined time t0 previously set. The timer value t is set at "0" when this routine is started. If the timer value t has not reached the predetermined time t0, (NO in S43), the assist control portion 61 increments the timer value t by "1" in step S44, and then temporarily exits the stop timing setting process, and then proceeds to step S50. The timer value t is incremented by value "1" every time the routine is repeated. Then, when the timer value t reaches the predetermined time t0 (YES in S43), the assist control portion 61 sets the stop flag Fs to "1"(step S45).

When the stop flag Fs is set to "1", a substantial content of the steering assist control is stopped from the next control cycle on, due to the result of the determination in step S30. That is, the stop timing setting process is a process of stopping the driving of the electric motor 20 caused by the steering assist control following the elapse of the predetermined time t0 after the actual amount of charge Jx of the subsidiary electric power source 50 has fallen below the stop criterion amount of charge Jmin.

Incidentally, the stop criterion amount of charge Jmin and the predetermined time t0 are set at such values that when the stop flag Fs is set to "1", the actual amount of charge Jx of the subsidiary electric power source 50 is at least a predetermined amount of charge that is greater than zero.

Figure 11:
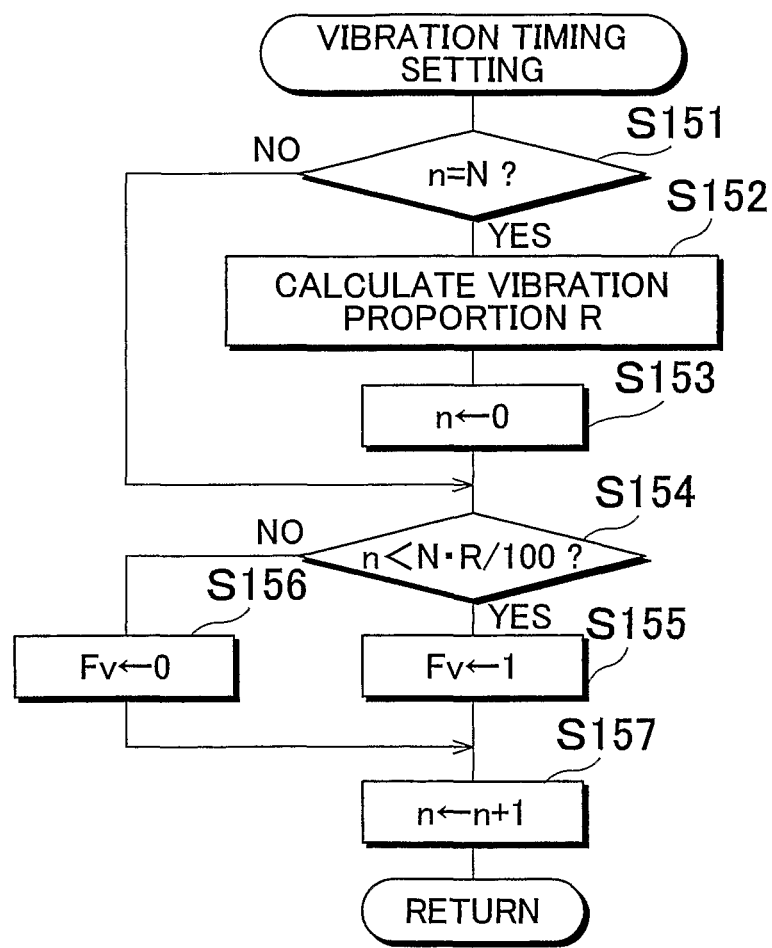
FIG. 11 is a flowchart a vibration timing setting routine in accordance with the second embodiment of the invention.

Next, the vibration timing setting process of step S50 that is executed subsequently to the stop timing setting process will be described. The vibration timing setting process is executed following the flowchart shown in FIG. 11.

In this second embodiment, in the case where the source power supply abnormality of the main electric power source 100 is detected, the steering handle 11 is intermittently vibrated by using the electric motor 20, and the proportion of the time of the vibration is increased in accordance with declines in the actual amount of charge Jx of the subsidiary electric power source 50. Therefore, in the vibration timing setting process of step S50, the timing of intermittently vibrating the steering handle 11 is set.

Firstly in step S151, the assist control portion 61 determines whether or not a count value n is equal to a set value N. The count value n is a variable that is incremented by value "1" every time the control routine is repeated, and is set at value "N" when the control routine is started. Therefore, in the initial cycle, the answer to the determination in step S151 is "YES", which is followed by the process of step S152. In step S152, the assist control portion 61 calculates a vibration proportion R from the actual amount of charge Jx of the subsidiary electric power source 50 by referring to a vibration proportion map. The vibration proportion R is the percentage of the time duration during which the steering handle 11 is vibrated to the total of the time duration of vibration and the time during which the vibration of the steering handle 11 is stopped in the case where the steering handle 11 is intermittently vibrated.

Figure 12:
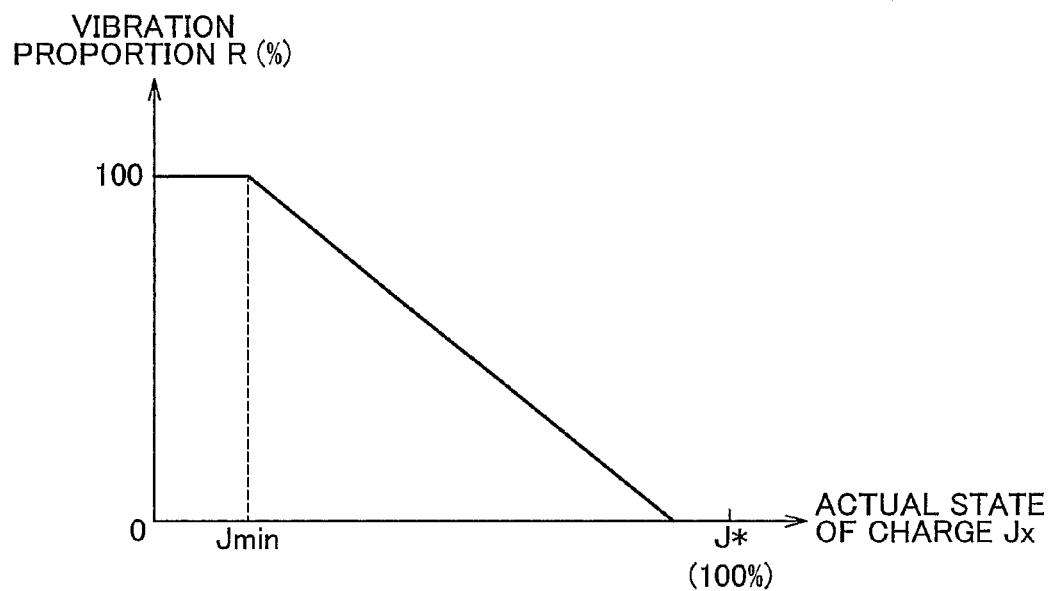
FIG. 12 is a characteristic diagram representing a vibration proportion map in accordance with the second embodiment of the invention.

In the vibration proportion map, a relation between the actual amount of charge Jx and the vibration proportion R is set as shown in FIG. 12. The vibration proportion map is stored in the memory of the electronic control unit 60. As shown in the vibration proportion map, the vibration proportion R is set so as to increase in accordance with declines in the actual amount of charge Jx, and is set at 100% when the actual amount of charge Jx is less than the stop criterion amount of charge Jmin. Incidentally, in this embodiment, if the subsidiary electric power source 50 is nearly fully charged, the vibration proportion R is set at 0%. However, this is not altogether necessary. For example, the vibration proportion characteristic may also be set so that when the source power supply abnormality of the main electric power source 100 is detected, the steering handle 11 is vibrated even if the subsidiary electric power source 50 is fully charged.

Subsequently in step S153, the assist control portion 61 sets the count value n to value "0". Next in step S154, the assist control portion 61 determines whether or not the following conditional expression (1) is satisfied: $n < N \cdot R/100$ ... (1). If the conditional expression (1) is satisfied, the assist control portion 61 sets a vibration flag Fv to "1" in step S155, and if not, the assist control portion 61 sets the vibration flag Fv to "0" in step S156. After setting the vibration flag Fv, the assist control portion 61 increments the count value n by value "1" in step S157, and then temporarily exits the vibration timing setting process. The vibration flag Fv is a signal that determines whether or not to vibrate the steering handle 11, as can be understood from the below description. Briefly, Fv=1 gives a vibration command, and Fv=0 gives a vibration stop command.

This process is repeatedly executed. Therefore, when the second cycle of this routine starts, the count value n is "1", and therefore the answer to the determination in step S151 is "NO", so that the process of steps S152 and S153 is skipped. In this case, therefore, a calculation process for the vibration proportion R is not performed, and the vibration flag Fv is set on the basis of the conditional expression (1) with the vibration proportion R being the previously calculated value.

Figure 13:
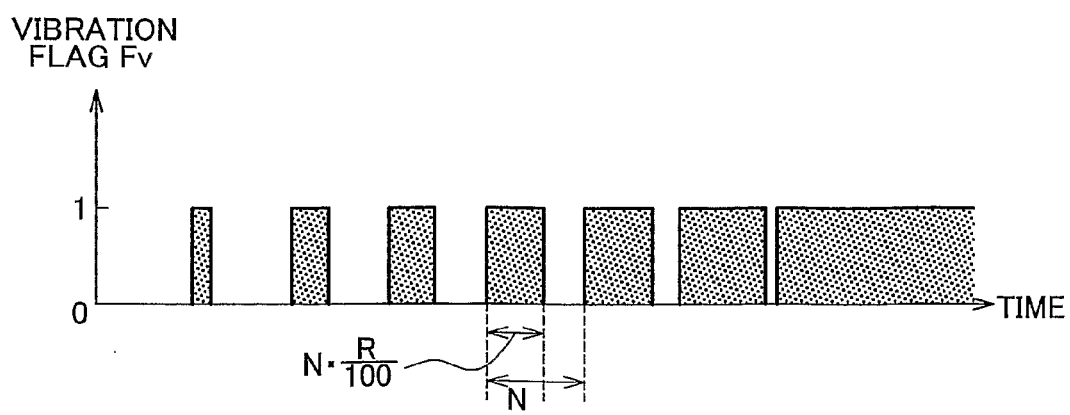
FIG. 13 is a graph illustrating the vibration proportion in accordance with the second embodiment of the invention.

The count value n is a value that increases at every predetermined time (every control cycle period of this routine), and therefore represents the elapsed time, but is cleared to zero every time an amount of time corresponding to the set value N elapses. This set value N sets the cycle period for the intermittent vibrations. Besides, in the right-hand side of the conditional expression (1), the vibration proportion R expressed in decimal form is multiplied by the set value N. Therefore, as shown in FIG. 13, the conditional expression (1) causes the vibration flag Fv to be set at "1" in every cycle until the count value n reaches the value (N·R/100).

That is, the vibration timing setting process is a process in which the vibration proportion R commensurate with the actual amount of charge Jx of the subsidiary electric power source 50 is periodically calculated, and the time duration during which the vibration flag Fv is set at "1" is set so as to be longer the greater the vibration proportion R. After the vibration timing setting process is executed, the process starting with step S19 is performed. Incidentally, when the vibration proportion R is set to 100% in the stop timing setting process, the determination process of step S156 is performed at that time point with the vibration proportion R set at 100%, without waiting for the calculation process in step S152.

Figure 15:
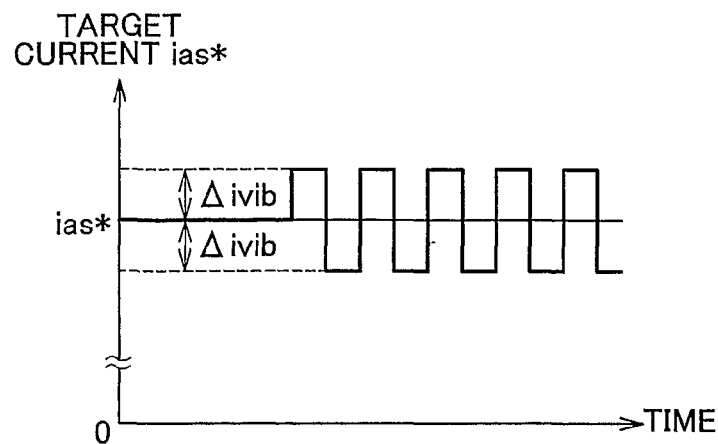
FIG. 15 is a graph representing changes in the target electric current during operation of vibration in accordance with the second embodiment of the invention.

The thus-set vibration flag Fv is subjected to the flag status determination in step S161 in steering assist control (FIG. 9). If the vibration flag Fv is "1" (YES in S161), the assist control portion 61 calculates a new target current ias* of the electric motor 20 obtained by adding a vibration-purpose current $\Delta$ivib to the present target current ias* (ias*←ias*+$\Delta$ivib) in step S162. The vibration-purpose current $\Delta$ivib is a value of current that corrects the target current ias* calculated in step S21 so that the output of the electric motor 20 vibrates, and is alternately switched between a positive value and a negative value at predetermined cycle period as shown in FIG. 15. For example, every time the steering assist control routine is executed, the sign of the vibration-purpose current $\Delta$ivib may be switched. Therefore, the target current ias* changes in a vibrating manner.

On the other hand, if in step S161 it is determined that the vibration flag Fv is not "1", the process of step S162 is not performed. Therefore, the vibration-purpose current $\Delta$ivib is not added to the target current ias* of the electric motor 20.

According to the above-described electric power steering device of the second embodiment, if the source power supply abnormality of the main electric power source 100 is detected, the assist characteristic is switched to the abnormality-time assist characteristic, and the steering handle 11 is intermittently vibrated. Therefore, the driver can be reliably made to be aware of the abnormality.

Furthermore, as shown in FIG. 14, as the actual amount of charge Jx of the subsidiary electric power source 50 declines, the vibration proportion R, that is, the proportion of the duration during which the steering handle 11 vibrates, increases. Therefore, the driver can easily be caused to anticipate that the abnormality of the electric power steering device is progressing (worsening), by both the steering handle operation becoming progressively heavier and the vibration duration of the steering handle 11 becoming progressively longer.

Besides, since the steering handle 11 is continuously vibrated after the actual amount of charge Jx falls below the stop criterion amount of charge Jmin, the driver can be caused to anticipate that the steering assist will soon stop. Therefore, when the steering assist stops after a predetermined time, the driver will not be surprised.

Besides, at a stage where the actual amount of charge Jx of the subsidiary electric power source 50 is greater than or equal to a predetermined amount of charge, the steering assist and the vibration of the steering handle 11 are stopped. After that, therefore, the electric power left in the subsidiary electric power source 50 can be effectively used by the electronic control unit 60.

Besides, since the electric motor 20 for the steering assist is used also as the actuator that vibrates the steering handle 11, there is no need to provide a special vibration actuator. Therefore, a cost increase is not brought about, and the installation space of the vibration actuator is not needed.

Besides, similarly to the first embodiment, the second embodiment can favorably maintain the source power supply from the subsidiary electric power source 50, and can elongate the period during which the steering assist is possible.

Incidentally, a function portion of the assist control portion that executes the process of steps S161, S162 corresponds to vibration control means in the invention, and a function portion of the assist control portion 61 that executes the vibration timing setting routine corresponds to vibration operation duration proportion control means in the invention, and a function portion of the assist control portion 61 that executes the stop timing setting routine corresponds to operation stop means in the invention.

While the electric power steering devices as embodiments of the invention have been described above, the invention is not limited to the above-described embodiments, but can be modified in various manners without departing from the object of the invention.

Figure 16:
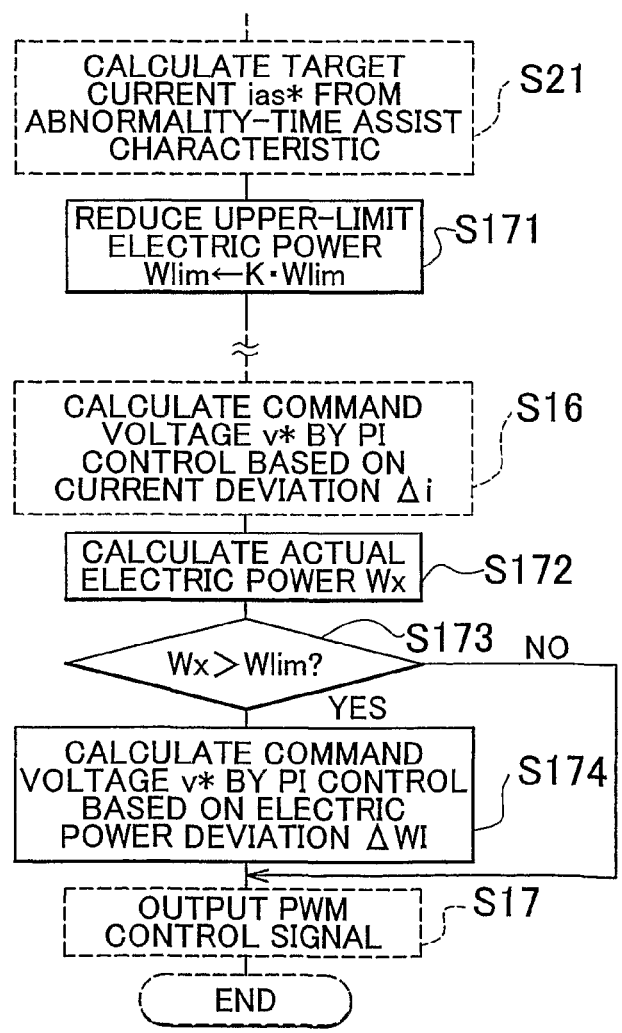
FIG. 16 is a flowchart representing a portion of a steering assist control routine in accordance with a modification of each of the aforementioned embodiments of the invention.

For example, when the source power supply abnormality of the main electric power source 100 is present, the upper limit of the electric power consumed by driving the electric motor 20 may be reduced so as to maintain the source power supply from the subsidiary electric power source 50 even more favorably. FIG. 16 is a flowchart representing a portion of a steering assist control routine as such a modification of the foregoing embodiments. This modification is a routine that includes a process of step S171 to step S174 in addition to the steering assist control routine of the first embodiment or the second embodiment. The added process will be described.

After calculating the target current ias* in step S21, the assist control portion 61 calculates an upper-limit electric power Wlim for setting an upper limit value of the electric power that is consumed by driving the electric motor 20 in step S171. This upper-limit electric power Wlim is found by multiplying the upper-limit electric power Wlim that is set when the source power supply from the main electric power source 100 is normal, by a reduction coefficient K (0<K<1) (Wlim←K·Wlim). That is, when the source power supply from the main electric power source 100 is abnormal, the upper limit value of the electric power consumption of the electric motor 20 is set at a smaller value than when the source power supply therefrom is normal. For example, in the case where the reduction coefficient K is 0.5, the upper-limit electric power Wlim is half the upper-limit electric power Wlim set at the time of normality of the source power supply.

In step S172, the assist control portion 61 calculates the actual electric power Wx that is consumed by driving the electric motor 20. The actual electric power Wx is calculated by multiplying the output voltage v2 detected by the second voltage sensor 52 and the output current i2 detected by the output current sensor 54. Subsequently in step S173, the assist control portion 61 determines whether or not the actual electric power Wx is larger than the upper-limit electric power Wlim. If the actual electric power Wx is larger than the upper-limit electric power Wlim (NO in S173), the assist control portion 61 outputs the PWM control signal commensurate with the command voltage v* calculated in step S16 to the motor drive circuit 30 (S17).

On the other hand, if the actual electric power Wx is larger than the upper-limit electric power Wlim (YES in S173), the process proceeds to step S174, in which the assist control portion 61 calculates a deviation $\Delta$W between the actual electric power Wx and the upper-limit electric power Wlim, and calculates a command voltage v* by the PI control (proportional-plus-integral control) based on the deviation $\Delta$W. That is, the command voltage v* is feedback-controlled so that the deviation $\Delta$W becomes zero. Then, the assist control portion 61 outputs the PWM control signal commensurate with the calculated command voltage v* to the motor drive circuit 30 (S17). Thus, the actual electric power Wx is restricted so as not to exceed the upper-limit electric power Wlim.

According to this modification, at the time of the source power supply abnormality of the main electric power source 100, the source power supply from the subsidiary electric power source 50 can be maintained even more favorably, so that it is possible to further elongate the period during which the steering assist can be performed.

Besides, in the foregoing embodiments, the assist map in which the relation between the steering torque Tx and the target current ias* is set is stored as an assist characteristic. However, a function that derives a target current ias* from the steering torque Tx, or the like, may also be stored as an assist characteristic. Besides, with regard to the shift amount map for calculating the characteristic shift amount ΔTx from the actual amount of charge Jx, and the vibration proportion map for calculating the vibration proportion R from the actual amount of charge Jx, too, other kinds of relation-connecting information, such as a function or the like, may also be used.

Besides, in the foregoing embodiments, the alteration of the characteristic of the assist map is performed by shifting the steering torque Tx to the increase side. However, the target current ias of the original assist map may also be multiplied by a reduction coefficient α ($0 \leq \alpha < 1$), so as to reduce the generation of steering assist force.

Besides, although in the second embodiment, the actuator that vibrates the steering handle 11 is realized by the electric motor 20 provided for generating assist torque, a different actuator may be provided. Besides, a construction in which the steering handle 11 is not vibrated may also be adopted. Although in the second embodiment, the steering assist and the vibration of the steering handle 11 are simultaneously stopped by setting the stop flag Fs to "1", the stop timing of the steering assist and the stop timing of the vibration may be separately set.

Besides, in the first embodiment, the timing of stopping the steering assist may be set on the basis of the actual amount of charge Jx of the subsidiary electric power source 50 so that the amount of charge of the subsidiary electric power source 50 at the time of stop of the steering assist is greater than or equal to a predetermined amount of charge thereof.

Besides, at the time of the source power supply abnormality of the main electric power source 100, a warning lamp (not shown) may be turned on in addition to the switching of the assist characteristic.

Besides, the electric motor 20 may be a single-phase motor, and the motor drive circuit 30 may also be an H-bridge circuit or the like. Besides, although in the foregoing embodiments, the charge/discharge of the subsidiary electric power source 50 is controlled by controlling the boosted voltage of the voltage boost circuit 40, other manners of control may also be employed. For example, the charging and discharging of the subsidiary electric power source 50 may also be switched and controlled by using a switching circuit.

In the embodiments of the invention, first electric power source abnormality detection means is able to detect a state in which the source power supply to the electric motor is stopped, for example, on the basis of the output voltage of the first electric power source. Besides, for example, in the case where the first electric power source is constructed of a battery and an alternator that charges the battery, the source power supply abnormality of the first electric power source can be detected by detecting abnormality of the alternator.

Besides, second source power supply capability detection means can perform, for example, as follows. That is, in the case where the second electric power source is a subsidiary electric power source (electric storage device) that stores electric power the first electric power source outputs, and that assists in the source power supply to the electric motor by using the stored electric power, the second source power supply capability detection means can detect the amount of charge of the second electric power source (the amount of charge stored therein), and can detect the source power supply capability of the second electric power source from the detected amount of charge.

In the case where the source power supply abnormality occurs in the first electric power source, a proper driving control of the electric motor cannot be maintained. In this case, it is preferable that the driver be caused to be aware of the occurrence of the abnormality in an early period, and that the steering assist function be sustained for as long a time as possible by favorably maintaining the source power supply from the second electric power source.

In the embodiments of the invention, it is permissible to set an abnormality-time assist characteristic in which the assist force relative to the steering torque is set lower the lower the source power supply capability of the second electric power source. In the embodiments of the invention, the timing of stopping the operation of the vibration actuator, and the timing of stopping the generation of the assist force by the electric motor do not need to be simultaneous with each other, but may also be set independently of each other.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A vehicle steering device comprising:
a steering mechanism that steers a wheel of a vehicle upon steering operation of a steering handle;
an electric motor that is supplied with source power from an electric power supply device in which a first electric power source and a second electric power source are interconnected in parallel, and that generates assist force that assists in the steering operation of the steering handle;
a steering torque detection device that detects steering torque that is input to the steering handle by a driver of the vehicle;
a motor control device that controls driving of the electric motor based on an assist characteristic in which a relation between the steering torque and the assist force is set so as to have a characteristic that the assist force changes according at least to the steering torque; and
a control device having a first electric power source abnormality detection portion that determines whether or not source power supply from the first electric power source is abnormal, a second source power supply capability detection portion that detects source power supply capability of the second electric power source, an assist characteristic switch portion that switches, when it is determined that the source power supply from the first electric power source is abnormal, the assist characteristic from the assist characteristic set for a time when the source power supply from the first electric power source is normal stepwise to an abnormality-time assist characteristic in which the assist force relative to the steering torque is set lower than in the assist characteristic set for the time of normality, and an assist characteristic alteration portion that alters, after the assist characteristic is switched stepwise to the abnormality-time assist characteristic by the assist characteristic switch portion, the abnormality-time assist characteristic so that the assist force relative to the steering torque further declines continuously in accordance with declines in the source power supply capability of the second electric power source detected by the second source power supply capability detection portion.

2. The vehicle steering device according to claim 1, wherein:
the first electric power source is a main electric power source that supplies source power to the electric motor and to a vehicle-mounted electrical load other than the electric motor; and
the second electric power source is an auxiliary electric power source that stores electric power the first electric power source outputs, and that supplies source power to the electric motor by using the electric power stored.

3. The vehicle steering device according to claim 1, wherein the second source power supply capability detection portion detects the source power supply capability of the second electric power source based on the amount of charge of the second electric power source.

4. The vehicle steering device according to claim 3, further comprising:
a voltage detection device that detects output voltage of the first electric power source; and
a current detection device that detects output current of the second electric power source,
wherein:
the source power supply from the first electric power source being normal is a state in which the detected output voltage of the first electric power source is greater than or equal to a predetermined value;
the first electric power source abnormality detection portion determines that the source power supply from the first electric power source is abnormal, when the detected output voltage of the first electric power source is below the predetermined value; and
the second source power supply capability detection portion calculates the amount of charge of the second electric power source based on the detected output current of the second electric power source.

5. The vehicle steering device according to claim 1, wherein the abnormality-time assist characteristic that is switched by the assist characteristic switch portion is the assist characteristic that is commensurate with the source power supply capability of the second electric power source detected by the second source power supply capability detection portion.

6. The vehicle steering device according to claim 1, wherein:
the assist characteristic is a characteristic in which the relation between the steering torque and the assist force is set based on the steering torque and a target current value of the electric motor; and
the assist characteristic switch portion switches the assist characteristic to the abnormality-time assist characteristic by shifting a value of the steering torque relative to the target current value to an increase side.

7. The vehicle steering device according to claim 6, wherein the assist characteristic alteration portion alters the abnormality-time assist characteristic by further shifting a value of the steering torque relative to the target current value to an increase side.

8. The vehicle steering device according to claim 1, further comprising:
a vibration actuator that vibrates the steering handle; and
a vibration control device that intermittently operates the vibration actuator if source power supply abnormality of the first electric power source is detected by the first electric power source abnormality detection portion.

9. The vehicle steering device according to claim 8, further comprising vibration operation duration proportion control device that increases an operation duration proportion in intermittent operation of the vibration actuator in accordance with declines in the source power supply capability of the second electric power source detected by the second source power supply capability detection portion, and for causing the vibration actuator to be in a continuously operating state when the source power supply capability of the second electric power source becomes below a reference level.

10. The vehicle steering device according to claim 9, further comprising operation stop device that stops the operation of the vibration actuator and generation of the assist force by the electric motor at elapse of at least a predetermined time after the source power supply capability of the second electric power source becomes below the reference level.

11. The vehicle steering device according to claim 8, wherein:
the vibration actuator is an electric motor; and
the vibration control device changes amount of electrification of the electric motor in a vibrating manner during a period during which the steering handle is vibrated.

12. A control method for a vehicle steering device that includes: a steering mechanism that steers a wheel of a vehicle upon steering operation of a steering handle; an electric motor that is supplied with source power from an electric power supply device in which a first electric power source and a second electric power source are interconnected in parallel, and that generates assist force that assists in the steering operation of the steering handle; a steering torque detection device for detecting steering torque that is input to the steering handle by a driver of the vehicle; and a motor control device for controlling driving of the electric motor based on an assist characteristic in which a relation between the steering torque and the assist force is set so as to have a characteristic that the assist force changes according at least to the steering torque, comprising:
determining whether or not source power supply from the first electric power source is abnormal;
detecting source power supply capability of the second electric power source;
switching, when it is determined that the source power supply from the first electric power source is abnormal, the assist characteristic from the assist characteristic set for a time when the source power supply of the first electric power source is normal stepwise to an abnormality-time assist characteristic in which the assist force relative to the steering torque is set lower than in the assist characteristic set for the time of normality; and
altering, after the assist characteristic is switched stepwise to the abnormality-time assist characteristic by the assist characteristic switch portion, the abnormality-time assist characteristic so that the assist force relative to the steering torque further declines continuously in accordance with declines in the source power supply capability of the second electric power source detected by the second source power supply capability detection portion.

13. The control method according to claim 12, further comprising:
detecting output voltage of the first electric power source; and
detecting output current of the second electric power source,
wherein:
the source power supply from the first electric power source being normal is a state in which the detected output voltage of the first electric power source is greater than or equal to a predetermined value;

it is determined that the first electric power source is in an abnormal source power supply state, when the detected output voltage of the first electric power source is below the predetermined value; and the source power supply capability of the second electric power source is detected based on the detected output current of the second electric power source.

* * * * *